United States Patent
Pych

(10) Patent No.: US 7,370,003 B2
(45) Date of Patent: May 6, 2008

(54) METHOD AND APPARATUS FOR IMPLIED ATTRIBUTION OF RESPONSES TO PROMOTIONAL CONTACTS

(75) Inventor: Joseph T. Pych, South Royalton, VT (US)

(73) Assignee: Amdocs Software Systems Ltd., Dublin (IE)

( * ) Notice: Subject to any disclaimer, the term of this patent is extended or adjusted under 35 U.S.C. 154(b) by 1260 days.

(21) Appl. No.: 10/290,547

(22) Filed: Nov. 8, 2002

(65) Prior Publication Data

US 2004/0093259 A1 May 13, 2004

(51) Int. Cl.
*G06F 17/60* (2006.01)
(52) U.S. Cl. ....................................... 705/10
(58) Field of Classification Search ............ 705/10
See application file for complete search history.

(56) References Cited

U.S. PATENT DOCUMENTS

| | | | |
|---|---|---|---|
| 5,692,107 A | 11/1997 | Simoudis et al. | |
| 5,857,175 A | 1/1999 | Day et al. | |
| 5,953,718 A | 9/1999 | Wical | |
| 5,983,220 A | 11/1999 | Schmitt | |
| 5,999,914 A | 12/1999 | Blinn et al. | |
| 5,999,942 A | 12/1999 | Talati | |
| 6,026,397 A | 2/2000 | Sheppard | |
| 6,029,176 A | 2/2000 | Cannon | |
| 6,076,068 A | 6/2000 | DeLapa et al. | |

FOREIGN PATENT DOCUMENTS

WO    WO 98/18094    4/1998

OTHER PUBLICATIONS

Exchange Applications, Inc., "Valex User Guide," entire booklet (1997).

*Primary Examiner*—Romain Jeanty
(74) *Attorney, Agent, or Firm*—Zilka-Kotab, PC

(57) ABSTRACT

Method and apparatus for performing automatic implied attribution is described, and in particular implied attribution in connection with a campaign. The campaign can be a marketing campaign in which actions (offer cells) are aimed at a contact group and behaviors are monitored within a defined evaluation period. By this method, the behaviors of the contact group can be attributed to the offer cells The method allows the monitoring of multiple behaviors for any number of offer cells for any number of contact groups. Contact groups can be obtained by any query process. The behaviors of a larger target group can also be implied where a link can be established between the contact group and the target group. Also described is a system for performing implied attribution, where the system can be software running on a general purpose computer.

39 Claims, 34 Drawing Sheets

Behaviors

| ID | NAME |
|---|---|
| 100 | Purchase Clunky Shoes |
| 101 | Inquire About Clunky Shoes |

Value Propositions

| ID | Name | Behaviors |
|---|---|---|
| 200 | 20% Off Clunky Shoes | 100: $20<br>101: $0 |
| 201 | 40% Off Clunky Shoes | 100: $10<br>101: $0<br>Non-Resp |

Offer Cell

| ID | Name | Vprop | Evaluation Period |
|---|---|---|---|
| 300 | 20% Off Clunky Shoes | 200 | [10,90] |
| 301 | 40% Off Clunky Shoes | 201 | [5,60] |

Promotion History

| | Offer | Customer | Extract Date |
|---|---|---|---|
| 91a | 300 | A | 1/1 |
| | 300 | B | 1/1 |
| 91b | 300 | C | 1/1 |
| 91c | 300 | D | 1/1 |
| | 300 | G | 1/1 |
| 91d | 301 | C | 2/1 |
| | 301 | E | 2/1 |
| 91e | 301 | G | 2/1 |
| | 301 | H | 2/1 |

FIG. 9

Sales Behavior Table

| 100 Customer | 101 Product | 102 Date |
|---|---|---|
| A | Clunky | 1/9 |
| G | Sneakers | 1/15 |
| D | Clunky | 1/17 |
| F | Clunky | 1/20 |
| E | Clunky | 2/15 |
| E | Sneakers | 2/15 |
| C | Clunky | 2/20 |
| H | Boots | 2/25 |
| H | Clunky | 2/28 |
| E | Clunky | 3/17 |
| B | Clunky | 4/2 |

FIG. 10A

Inquiry Behavior Table

| 103 Customer | 104 Product | 105 Date |
|---|---|---|
| H | Clunky | 2/15 |
| G | Sneakers | 2/20 |
| F | Clunky | 2/21 |

Identify Behaviors Associated with Behavior Data

120b

Identify All Value Propositions Targeting Behavior

120c

Identify Offer Cells Using That Value Proposition

FIG. 12B

Sales Table - Attributed

| Customer | Product | Date | Attribution |
|---|---|---|---|
| A | Clunky | 1/9 | N (Too Early) |
| G | Sneakers | 1/15 | N (Wrong Product) |
| D | Clunky | 1/17 | Y - 300 |
| F | Clunky | 1/20 | N (Not Promoted) |
| E | Clunky | 2/15 | Y - 301 |
| E | Sneakers | 2/15 | N (Wrong Product) |
| C | Clunky | 2/20 | Y - 300, 301 |
| H | Boots | 2/25 | N (Wrong Product) |
| H | Clunky | 2/28 | Y - 301 |
| E | Clunky | 3/17 | Y - 301 |
| B | Clunky | 4/2 | N (Too Late) |

FIG. 13

|     | Customer | Product | Date | TB-Winner | Lag-Days | OC |
|-----|----------|---------|---------|-----------|----------|-----|
| 148 | D | Clunky | 1/17/98 | N → Y | 6 | 300 |
|     | E | Clunky | 2/15/98 | N → Y | 9 | 301 |
| 149 | C | Clunky | 2/20/98 | N → N | 40 | 300 |
| 147 | C | Clunky | 2/20/98 | N → Y | 14 | 301 |
|     | H | Clunky | 2/28/98 | N → Y | 22 | 301 |
|     | E | Clunky | 3/17/98 | N → Y | 39 | 301 |

FIG. 14

| Customer | Product | Date | TB-Winner | Lag Days | Offer Cell |
|---|---|---|---|---|---|
| D | Clunky | 1/17/98 | N → Y | 6 | 300 |

FIG. 16A

| Customer | Product | Date | TB-Winner | Lag Days | Offer Cell |
|---|---|---|---|---|---|
| D | Clunky | 1/17/98 | N → Y | 6 | 300 |
| E | Clunky | 2/15/98 | N → Y | 9 | 301 |

FIG. 16B

Responses

| Offer | Customer | Offer Date | Resp Date | Behavior | Winner? | Return Contribution |
|---|---|---|---|---|---|---|
| 300 | D | 1/1 | 1/17 | 100 | Y | $20 |
| 301 | E | 2/1 | 2/15 | 100 | Y | $10 |
| 301 | H | 2/1 | 2/15 | 101 | Y | $0 |
| 300 | C | 1/1 | 2/20 | 100 | N | $20 |
| 301 | C | 2/1 | 2/20 | 100 | Y | $10 |
| 301 | H | 2/1 | 2/28 | 100 | Y | $10 |
| 301 | E | 2/1 | 3/17 | 100 | Y | $10 |
| 301 | G | 2/1 | 4/2 | 0 | Y | $0 |

FIG. 17A

Behavior Group Table

| | 190 | 191 | 192 | 193 | 194 |
|---|---|---|---|---|---|
| | Offer Cell | Behavior Group | ID | Eval. Start | Eval. End |
| | 300 | Purchase | 100 | 10 | 90 |
| 195 | 300 | Inquire | 101 | 10 | 90 |
| | 301 | Purchase | 100 | 5 | 60 |
| 196 | 301 | Inquire | 101 | 5 | 60 |

FIG. 19

METHOD AND APPARATUS FOR IMPLIED ATTRIBUTION OF RESPONSES TO PROMOTIONAL CONTACTS

FIELD OF THE INVENTION

The invention relates to methods and systems for analyzing and selecting records stored in a computer database, and more particularly, to methods and systems for attributing a cause and effect relationship.

DISCUSSION OF THE RELATED ART

Automated marketing has become very important for many businesses. For automated marketing, a great number of potential customers may be contacted, in the hopes of increasing sales. Because the cost of contacting every person can be prohibitive, some selectivity in determining who to contact may be required.

FIG. 1 illustrates three possible stages of a marketing program and strategy. The first stage 10 is the planning of a campaign. The campaign can involve targeting a desired audience and selecting specific actions to be made towards the desired audience. (For example, the campaign may involve selecting a number of people to receive a five dollar off coupon in the mail. The people receiving the coupons are the desired audience and the specific action is the mailing of a five dollar off coupon.)

This plan can be executed in stage 12. (For example, execution may involve identifying the desired audience and sending off five dollar coupons to that audience.)

A relatively undeveloped area, however, remains in assessing the effects of the campaign, indicated as stage 14. While a marketing analyst can extract customer behavior data (such as purchase records) from a database by a variety of known methods, the analyst may also wish to link a particular aspect or action of the campaign to a particular audience behavior. (For example, did mailing the five dollar off coupon result in a sale?) The ability to form this link is referred to as "attribution." Once the link has been established, the analyst can use this knowledge towards planning a more sophisticated and possibly more successful campaign.

Campaign Planning and Execution (10 and 12 of FIG. 1)

Computer databases have proliferated in the marketing context. For example, extremely large databases (or "data warehouses") have been generated for marketing data. While this data may be easy to compile (in some applications), using the information to achieve a goal can be challenging.

A database may be thought of as including one or more tables, with rows of the table corresponding to individual records in the database. For example, in the database 13 of FIG. 2, the first row 19a indicates the labels for fields of the overall table 15. The term "table" refers to any group of associated records, whether stored in actual table format or otherwise. Each of the rows 19b-19e is an individual record corresponding to an individual person (in this example). The term "record" includes any associated set of fields (e.g. the fields in row 19b of FIG. 2) no matter how it is stored. Thus, in row 19b, a person has a name "1" (column 17a), an age of 65 (column 17b), and an income of $60,000 (column 17c). While the description of the invention may be provided with reference to records (e.g. 19b-19e of FIG. 2) within a table 15 in a database 13, this is not intended as limiting. The present invention has application for analysis and selection of stored information in a database, no matter what the particular internal representation is. The database may be digital information stored in any digital storage medium, such as conventional random access memory, tape storage, CD-ROM, and others.

The database may be built using a great variety of information for each corresponding component or record of the database. For example, in a database where the records correspond to individuals, the individual's age, address, and income may be readily available information for input to the database. These individual fields, however, may not be meaningful for determining any action in the future. For example, if a business wishes to send out a targeted mailing, the business would like to estimate which of the records in a database of individuals corresponds to individuals who are likely to respond favorably to the targeted mailing. Simple analysis of the available fields in the database (e.g., age, income, and others) may not be sufficient to perform this task.

Accordingly, a number of techniques have been developed for manipulating the known fields (i.e., the characteristics recorded in the database, corresponding to the columns 17a-17c, i.e., name, age, and income) to determine a new characteristic (e.g., field) that is more meaningful. Such techniques include those referred to in the art as "data mining."

FIG. 3 illustrates one method of using a customer database to conduct a marketing campaign. The database 30 includes a table 33. The table 33 may be as generally described above, i.e., including a number of individual records corresponding to persons (households, businesses, entities or anything else), e.g., rows 31b-31e, in a number of fields for each record (corresponding to 32a-32d). (While illustrated as a single table 33, this may actually be stored in multiple tables, joined by a key.) One or more of the fields may correspond to a characteristic computed according to one of the above models generated through data mining or other technique, e.g. column 32d having a score.

The table 33 may be provided to a campaign manager 34. The purpose of campaign management is to select and categorize the records of the database (e.g., a corresponding row, such as 31b, 31c, 31d or 31e) for a variety of actions (or create a "segment" or segments of the database for action).

A "campaign management system" is a system that can perform this function. In one embodiment of such a system, individual records (e.g., potential customers) may be selected for one or more of actions 36a-36d. For example, action 1 36a may correspond to sending a person a coupon through the mail. Action 2 36b may correspond to making a telephone call to the individual. Action 3 36c could be storing the record in a history log.

In this example, the purpose of the campaign manager would be to select which of the records 31b-31e should be sent to which of the action items 36a-36d. Thus, based on the selection criteria, person "1" (row 31b) may receive a coupon through the mail, while person "3" (row 31d) receives the telephone solicitation (e.g., action 2 36b). All of the records may be stored in a promotional log or promotional history table as a part of action 3 36c.

A number of campaign management systems are known in the art. One example is the VALEX™ software available from Exchange Applications™, LLC, of Boston, Mass. Other examples include: One-by-One, available from Paragren of Reston, Va.; PRIME VANTAGE, available from Prime Response of Brentford, UK (US: NY, N.Y.); IRE Marketing Warehouse, available from Harte Hanks of Billerica, Mass.; Quiddity, available from May & Speh of Downers Grove, Ill.; and Epsilon Campaign Manager, available from Epsilon of Burlington, Mass.

The campaign management system may be implemented using a software program implemented on a general purpose computer. Of course, special hardware implementations or hardware component designs could be used.

FIGS. 4A and 4B illustrate one way of performing a campaign management process. The process begins at a step 40, where a campaign is formed. This corresponds to supplying a table (e.g., 33 of FIG. 3) to a campaign manager (34 of FIG. 3). In the corresponding example of FIG. 4B, a campaign process has simply begun at 40a.

At a step 42, a de-duplication (or "dedupe") may be performed. This step may be best understood with the following step, 44, where queries are performed. A query is an inquiry, in any form, that can be used to classify or sort records. The queries step 44 may involve different ways of defining subsets of records in an input database. Thus, in FIG. 4B, a query 1 44a might take all records for persons with an income over thirty thousand dollars. A second query 44b might select records of the database that have an income of over twenty five thousand dollars and an age of over 45. In this particular example, a person who is over 45 and has an income of over thirty thousand dollars would satisfy both the first query and the second query. One alternative for handling this is to permit records to follow both paths of the decision tree illustrated in FIG. 4B. That is, a record for a person having an age over 45 and an income over thirty thousand dollars would follow the analysis proceeding from both steps 44a and 44b of FIG. 4B.

An alternative, however, is to require that each record in the database follow at most only one of branches corresponding to the queries 44a and 44b. In this way, duplication of the records is avoided in the query process. Here, the Dedupe step 42a might take all of the persons satisfying the first query 44a and have those processed only according to that branch of the decision tree. Those records (and only those records) that do not satisfy the first query 44a would then be tested under the second query 44b. In effect, therefore, the second query 44b would only include records with fields having an income of more than twenty five thousand dollars per year but less than (or equal to) thirty thousand dollars per year and an age of over 45.

After the query stage 44, a split step may be performed. In the split step, the records that satisfy any applicable preceding query or queries may be divided. The division may, for example, be a random division based on percentage. Thus, at step 46a of FIG. 4B, a random 95% to 5% split is performed. At step 46b, no split is effectively performed—all of the records satisfying the second query at 44b are passed along through the step illustrated at 46b.

At a step 47, the various records of the database have been divided into groups that are ready for action. Thus, for example, at a step 47a, a first value proposition may be selected to form an offer cell, such as a value proposition of mailing a five dollar coupon and a corresponding offer in the context of this campaign. A "value proposition" refers to any action of a campaign, such as the mailing of a coupon or a telephone solicitation. The value proposition can involve direct or indirect economic expenses, such as the cost of a mailing or a telephone solicitor's salary. Accordingly, any record passed to step 47a would be selected for the mailing of a five dollar coupon. At a step 47b, an alternative action might be to take no action at all—and any record falling into this class would be assigned a value corresponding to taking no action. Finally, at a step 47c, a value of mailing a ten dollar coupon could be assigned (and the record associated with the corresponding offer cell).

After the corresponding values have been assigned, at step 47, an extract step 48 may be performed. According to this step, one or more output files (or tables) may be formed. The output files may be records (or portions of records) associated with the applicable action assigned at the value proposition offer cell step 47. For example, a first extract for 48a may be formed in the example of FIG. 4B for providing a file to a mail order house that would arrange for mailing of appropriate coupons. In this case, an output data file could be formed that includes the name, an address field, and the particular value proposition (i.e. mailing a five dollar or ten dollar coupon). This output file could then be provided to the appropriate facility for taking the assigned action.

A second possible extract would be to simply log all of the records that were processed through the particular campaign, i.e., form a promotion history log.

The general campaign management process (whether or not corresponding to the particular example described above with reference to FIGS. 4A and 4B), can be implemented using software on a general purpose computer, such as a personal computer. Similarly, campaigns can be built using one or more graphical user interfaces. For example, a graphical interface could permit users to graphically build campaign trees such as the one illustrated in FIG. 4B.

As described with reference to FIG. 4A, a part of the campaign management process is selecting subsets (or "contacts") for further processing (at steps 46-48).

FIG. 4C illustrates one graphical interface for constructing a query. This interface is available in the VALEX™ program sold by Exchange Applications of Boston, Mass.

The screen 50 may be displayed on the screen of a general personal computer, or any other computer. The screen may include a set of fields 51, such as available in conventional software programs. For example, there may be a file field, an edit field, a view field, an options field, a tools field and a help field.

Some or all of the possible commands that can be entered may also have push button interfaces 52. Thus, a new document could be opened or the existing query saved by pressing an applicable button on the tool bar 52.

The interface may include an area for selecting the form of the current query being editing or constructed, as illustrated at 53a. The view shown in FIG. 4C, as illustrated at 55, shows a visual form of a query, e.g., a simple form of query examining two fields within a table—age (to be greater than 25) and income (to be greater then thirty thousand dollars per year). An alternative is to show the current query being edited or constructed as a series of SQL (standard query language) statements.

A tool for editing query types 53b may also be included. This tool would permit a user to specify the type of record that is being examined in the particular query (or, the type of record selected within a subset generated as the result of the query). For example, the query type may focus on selection of particular customers within a table of customers, as in the example of FIG. 3. Any other possibility could be used for a query type, e.g., transactions, households, or items.

The graphical interface 50 may also include a table selection tool 53c. This permits the user to select a table within the user's database for examination. Thus, the user's database may include a number of tables (including redundant or overlapping information and coordinated by a key). For example, a database might include a table that includes only customer names and the associated income while another table might include only customer names and corresponding addresses.

A display area 55 may display the current query being edited or created.

Additions or alterations to the current query being edited can be done with a separate pop-up tool bar 54a-54h. Thus, a cursor marker (not shown) present in the current query 55 could indicate where additional query language commands could be inserted.

One tool 54a can be used for generating a comparison between a field of the table being examined and a specified value. One example of a field-operator-value query is shown at 55. The age field of the database is compared with a specified value—"25".

A "field-operator-field" tool 54b may be invoked by depressing the button 54b. This would permit the user to create a comparison of one field of a database with another field, e.g., creating a comparison of the age field and the income field for records within a database.

A "query" tool button 54c might permit a user to import a saved query into the present query being edited.

A "comment" button 54d might permit a user to invoke a comment function that would allow the user to make comments related to the query—such as memorializing why the query was structured as it was.

An "SQL" button 54e might allow a user to input SQL statements as a part of the query being generated 55.

An "and/or" button 54f may be used to prevent a user to input an and statement (such as the one indicated at 55) or an or statement.

A "not" tool button 54g could permit a user to input a not statement, corresponding to the Boolean operation not.

A "group by/having" button 54h that would permit a user to invoke a "group by/having" tool. This button could be used to permit a user to aggregate values within a field for a particular record. For example, if the record corresponds to a customer, the "group by/having" tool could be used to create an aggregation (or average or maximum or minimum, etc.) of all of the purchases that the customer has made. Here, for example, the group by/having tool could be used to aggregate the sum of purchases and test whether that sum is more than one thousand dollars.

One campaign management system is described in U.S. patent application Ser. No. 09/097,875 entitled "Integrating Campaign Management and Data Mining" naming Kurt Thearling as inventor and filed Jun. 15, 1998, which is hereby incorporated by reference in its entirety.

Of course, other interfaces and other tools for use within an interface are possible.

SUMMARY OF THE INVENTION

According to one embodiment of the present invention, method and apparatus are provided for implying a relationship between marketing contacts that were made and behavior to determine whether those contacts were successful in obtaining desired behavior.

According to another embodiment of the present invention, a method of automatically attributing a plurality of behavior records to a first offer of a campaign is disclosed. In this embodiment, the first offer is associated with a first contact group including a plurality of contacts. This embodiment includes steps of providing access to behavior records to an automated attribution system, inputting a first target behavior to the automated attribution system, determining by automated implied attribution which of the behavior records are attributable to the first offer and recording the results. According to this embodiment, the first target behavior may be associated with the first offer and a second target behavior for the first offer may be input to the automated attribution system, with implied attribution being performed to determine which of the behavior records are attributable to the first offer based on both the first and second target behaviors. According to another embodiment of this method, a second offer may be included for the campaign, with implied attribution being performed to determine which of the behavior records are attributable to the second offer as well as the first. To perform implied attribution, a query may be formulated to capture behavior records. According to another embodiment of this method, implied attribution process may be performed successively over time. According to additional embodiments of this method, attribution criteria (such as a time window) may be input to determine when attribution of a behavior record to a contact is appropriate.

According to another embodiment of the present invention, an automated attribution system is provided. This embodiment includes means for accessing behavior records and means for automatically implying attribution of the behavior records to a first offer of a campaign.

According to another embodiment of the present invention, a method of recording attribution information on a computer storage medium is disclosed. According to this embodiment, attribution information is provided with respect to a plurality of behavior records and an offer. Response records are recorded in a response table stored on the computer storage medium, each response record being associated with at least one respective behavior record. The response record may include a field specifying time of behavior, entity information or a type of behavior for the response record.

According to another embodiment of the present invention, a computer program emdodied on a computer readable medium for attributing behavior records to an offer of a campaign is disclosed. According to this embodiment, the program includes a code segment to provide access to the behavior records, a code segment to allow input to a first target behavior and a code segment to determine by implied attribution which behavior records are attributable to the offer.

BRIEF DESCRIPTION OF THE DRAWINGS

FIG. 7A illustrates an example of behavior table;

FIG. 7B illustrates an example of a value proposition table;

FIG. 7C illustrates an example of an offer cell table;

FIG. 7G illustrates an example of a graphical interface for defining attribution value proposition data;

FIG. 9 illustrates an example of a promotion history table;

FIG. 10A illustrates an example of a sales behavior table;

FIG. 10B illustrates an example of an inquiry behavior table;

FIG. 12B illustrates an example for identifying offer cells;

FIG. 13 illustrates an example of an attributed sales table;

FIG. 14 illustrates an example of a work table;

FIG. 16A illustrates an example of a work table during the evaluation period;

FIG. 16B illustrates an example of a work table during the evaluation period at a later lag time after the lag time of FIG. 16A;

FIG. 17A illustrates an example of a response table;

FIG. 19 illustrates an example of a behavior group table;

DETAILED DESCRIPTION

Figure 1:
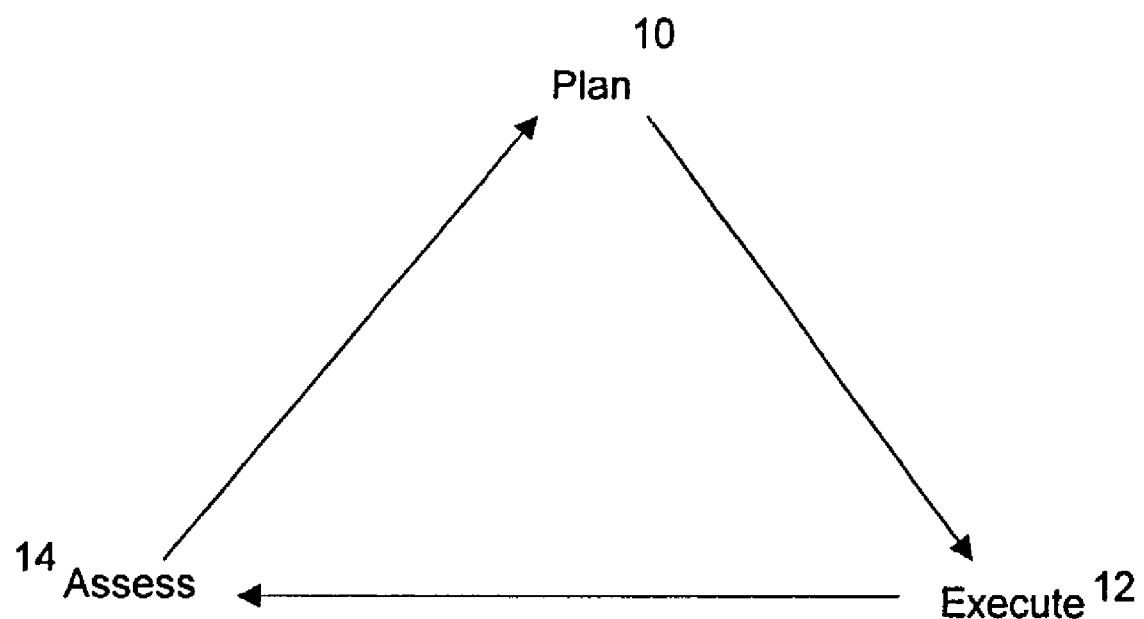
FIG. 1 illustrates three possible stages of a marketing program and strategy.
Figure 2:
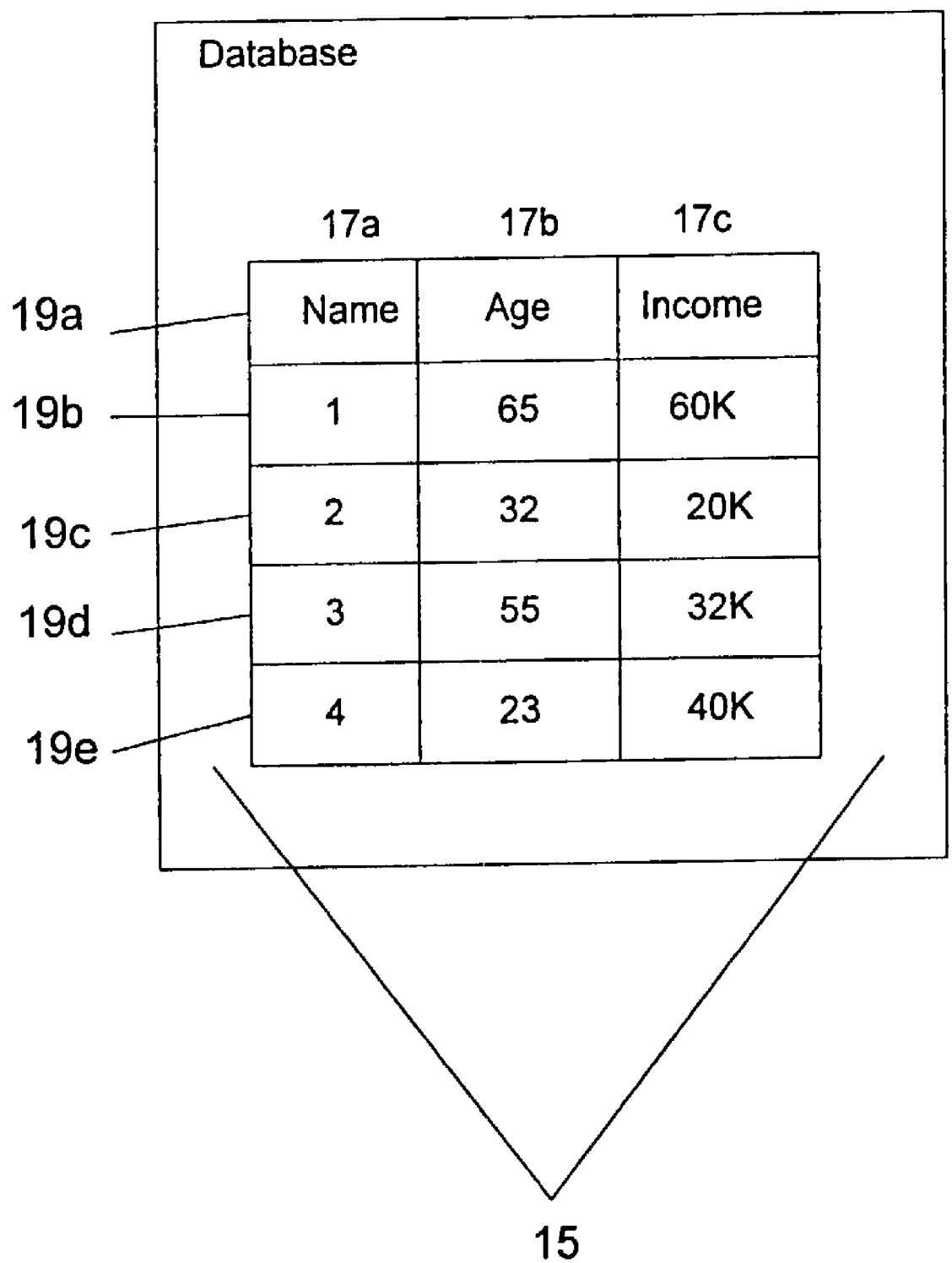
FIG. 2 illustrates an example of a database.
Figure 3:
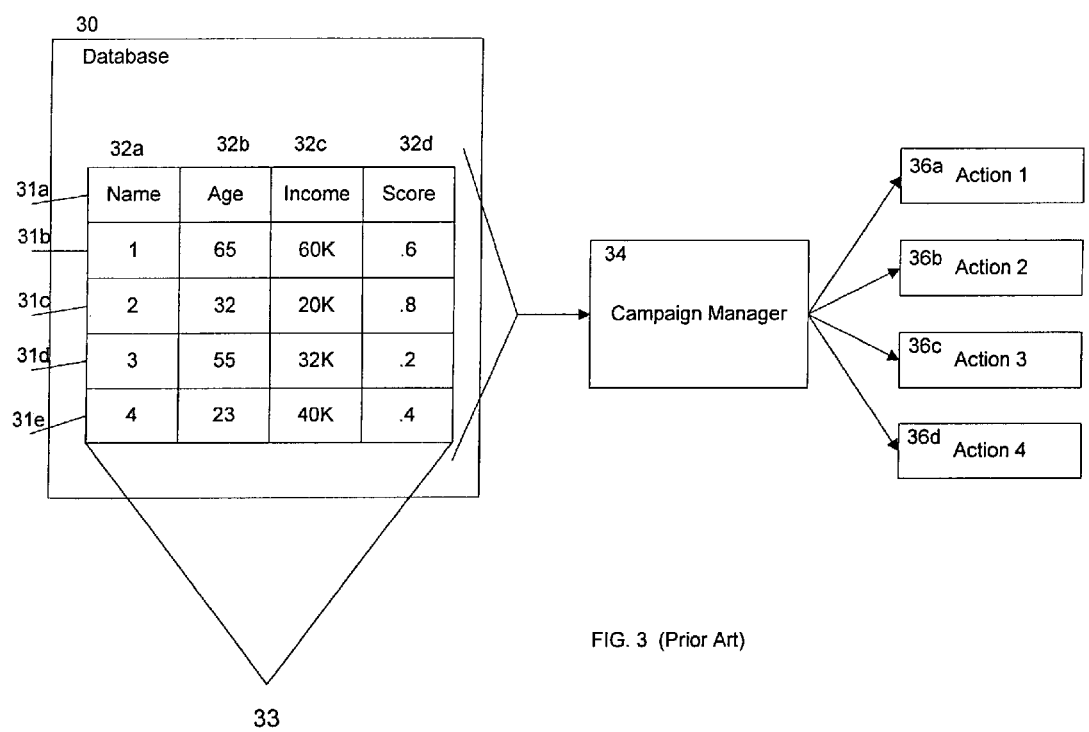
FIG. 3 illustrates an example of use of a campaign manager to perform campaign management.

One component of the assessing step in FIG. 1 involves attribution. Attribution, in general, is the act of assigning a cause to an effect. In the example of a marketing campaign, a business may carry out a campaign to contact potential customers through certain actions to effect a desired customer response or behavior. Examples of customer desired or "targeted" behaviors can be the use and/or purchase of a product. The operator of the business may then question whether these particular actions were instrumental in obtaining the targeted customer behaviors.

Behavior can be attributed in two ways: direct and implied attribution. The attribution is direct when a behavior can unambiguously be assigned to a value proposition of the campaign. For example, a contact action can be the mailing of catalogs, each catalog having a unique customer code. When a customer purchases a product over the phone and gives the customer code, the purchase of the product can be directly attributed to the mailing of the catalog.

Implied attribution involves formulating (intelligent) guesses about when to assign the customer behavior as attributable to a particular action. For example, if a customer purchases a product shortly after receiving a coupon for that product in the mail, one may imply that the purchase is attributed to the coupon mailing.

Other responses may be difficult to unambiguously attribute, such as increasing a bank account balance by a certain percentage, or making an inquiry about a product. There may be a margin of error in assigning the behavior to a campaign action (or offer cell), but a well-designed set of attribution rules can reduce this error.

Implied attribution of customer behavior to specific marketing acts is currently done ad hoc. For example, the individual marketing analyst must determine how to perform implied attribution and independently formulate a way of performing that attribution. For example, the marketing analysts must formulate their own queries to identify a set of responders (customers exhibiting targeted behavior) that are (implied to be) attributable to specific marketing acts.

One aspect of certain embodiments of the present invention provides a method for automatically performing implied attribution. Such implied attribution may be coordinated with the planning and executing of a campaign using a campaign management system. In certain embodiments, the implied attribution can be performed for multiple customer behavior types, with attribution performed concurrently for more than one behavior.

A "behavior" is a characteristic or action by customers or potential customers. Behavior targeted by a campaign is preferably of a form that can be monitored via data input into a database. Targeted behaviors may include, for example, product purchase, an increase in product usage above a set threshold value, product inquiry, a store visit, or an increased credit line. Other types of behaviors may also be monitored, such as decreased usage (e.g., of a credit card), canceling an account, nonpurchase of a product or a lack of any response at all.

Figure 5:
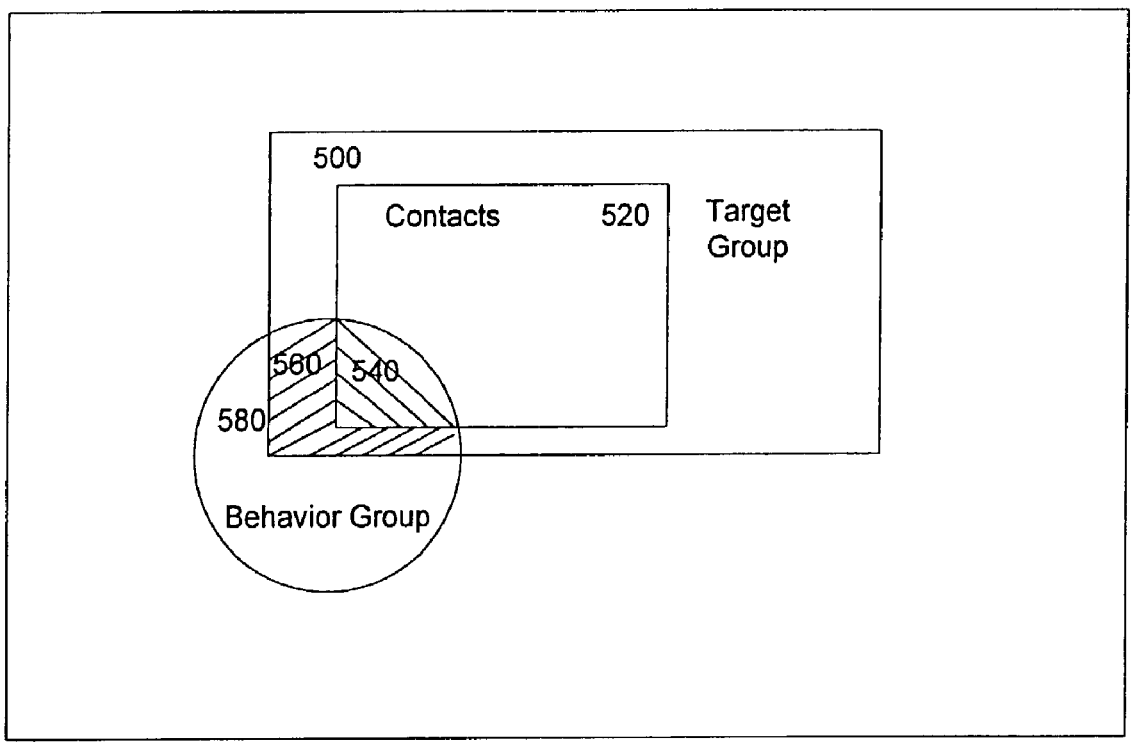
FIG. 5 illustrates the concept of implied attribution through a Venn diagram.

FIG. 5 illustrates the concept of implied attribution. FIG. 5 is a Venn diagram. Box 520 includes a number of contacts made as part of a marketing campaign. For example, the contacts may be the mailing of five dollar off coupons to a number of heads of households. The targeted behavior may be the purchase of shoes (for example, using the five dollar off coupon). A behavior group 580 includes all of the people who exhibited the targeted behavior—such as all people purchasing the shoes. Not everybody who purchased shoes, however, did so because they received the five dollar off coupon. One might infer, however, that the people who were contacted (box 520) and who exhibited the appropriate behavior (behavior group 580) exhibited the behavior because of the contact (area 540) (e.g., purchased the shoes because of the five dollar off coupon). (Of course, the mere fact that somebody exhibited the behavior and was in the contact group may not be enough to imply that the contact resulted in the behavior; for example, somebody who exhibited the behavior (purchasing shoes) before the contact 520 was made (before the five dollar coupon was mailed) can not appropriately be attributed as having the contact 520 cause the behavior 580.)

Some contacts may result in (targeted) behavior exhibited by others. It may be desirable to attribute these benefits to the campaign. For example, consider contacts 520 made to heads of households. The head of the household may exhibit the desired behavior, and be classified within the inner section of the behavior group 580 and the contact group 520 as indicated in the shaded region 540. On the other hand, somebody within the household other than the head of the household may exhibit the desired behavior. For example, if a coupon is mailed to the head of the household and a child in the household exhibits the desired behavior, that behavior may be attributed to the contact.

Thus, a target group 500 may be defined. In the above example, the target group 500 may include everyone within the households for heads of household 520 which were contacted. Thus, where there is a target group 500 that includes more entities than just the contacts 520, behavior by members within the entire target group may also be attributed to a marketing campaign, as indicated in the shaded region 560. In sum, the desired behavior exhibited by members within the shaded regions 560 and 540 may be attributable to the marketing campaign consisting of the contacts 520 that were made.

FIG. 5 illustrates an example using just one set of contacts 520 and one targeted behavior. According to another aspect of certain embodiments of the present invention, multiple sets of (potentially overlapping) contacts may be tracked. In addition, multiple different desired behaviors may be tracked. As described below, this will permit a sophisticated analysis of the effectiveness and benefits of a marketing campaign.

One embodiment of the invention provides a method for planning and executing a marketing campaign, followed by performing implied attribution for analysis or further use within a campaign. Campaign planning and execution can involve processes as outlined previously or by any other method known in the art. Data input variability and flexibility can be included which can enhance typical campaign planning methods and lead to more sophisticated campaign strategies.

Figure 6:
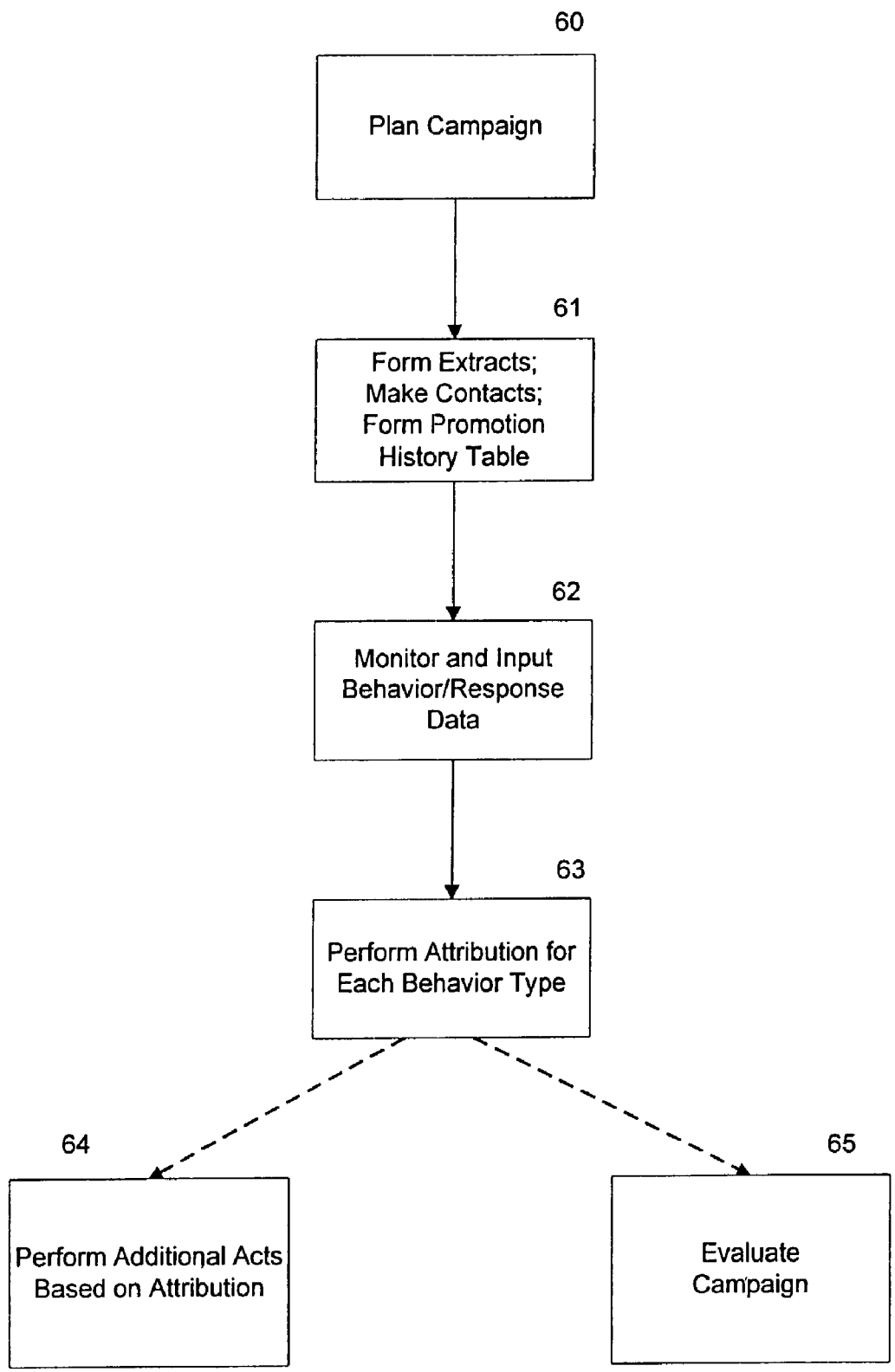
FIG. 6 illustrates one method for performing implied attribution.

FIG. 6 illustrates one embodiment of a method using implied attribution. At a step 60, a campaign is planned. The campaign planning process may involve steps known in the art for campaign management, as described above with respect to the VALEX System (as well as other systems). Thus, for example, queries may be formed in order to select sets of individuals for respective actions (offer cells). In addition, as a part of step 60, additional data may be input into the system for use in implied attribution later. For example, targeted types of behavior may be input, and data about the benefits and costs of the campaign may be provided as described more fully below.

At a step 61, the campaign is executed. That is, the campaign rules are performed to form files (or "extracts") which specify what actions (offer cells) to take with respect to which people (contacts within a contact group). Those actions (or contacts) may then be performed. In this process, a promotion history table may also be formed (or updated). A promotion history table includes data summarizing the actions of the campaign. These steps will be described more fully below with respect to an example.

At a step 62, behavior data is monitored and provided to an automated attribution system.

At a step 63, attribution is performed for each type of behavior that is monitored. That is, those behaviors which can be attributed to contacts that were made as part of the campaign (as reflected in the promotion history table) are attributed.

FIG. 6 illustrates two possible uses of this attribution data. In one use (at a step 64), additional acts are performed based on the attribution. For example, successful contacts (which resulted in the desired behavior) may receive a follow-up (such as a thank you or an additional coupon). In the alternative or in addition, customers who did not respond at all may receive a different type of follow-up.

Step 65 illustrates an alternative use of the attribution information determined at step 63. In step 65, the attribution data is used to evaluate the campaign. For example, the increased revenue (e.g., from attributed sales of products) may be compared with the total costs of the campaign.

Returning to step 60, a campaign is planned. In certain embodiments this planning may be performed by inputting to a campaign management system data related to value propositions, and other data, that is useful in the attribution process. This data may include information about targeted behaviors or information about when implied attribution is appropriate.

FIGS. 7A-7C provide examples of inputting this type of information.

FIGS. 7A and 7B illustrate examples of a behavior table and a value proposition table respectively. In the example, a marketer wishes to target a group of people for the purchase of "clunky" shoes.

In FIG. 7A, column 70b lists the behaviors that the marketer wishes to monitor and column 70a defines an identification key for each behavior type. From column 70b, the behavior in this example can be a shoe purchase or an inquiry about the shoes. The marketer is not confined to simple customer responses such as a purchase and more than one behavior can be monitored concurrently. The table can be a master list of behaviors tailored for a particular business and the method allows selection of particular behaviors from the master list. These tables are not limited to the fields shown in the invention and other fields can be included.

Table I shows an example of various fields in the behaviors table which may be used.

TABLE I

| Field Name | Data Type | Key | Description |
| --- | --- | --- | --- |
| PROGRAM_VERSION | INTEGER | PK | The schema version which can be used to assure table is used with compatible program. |
| BEHAVIOR_ID | INTEGER | PK | The unique identifier of this behavior. |
| TRACKING_CODE | VARCHAR(10) | | The unique tracking code of behavior. This code is typically used for tracking promotion history and response activity. |
| BEHAVIOR_NAME | CHAR(255) | | The name of this behavior (e.g. "Purchase Product") |
| BEHAVIOR_TYPE | INTEGER | | Type of Behavior (Action Oriented or other type) |

PK indicates that this field may be used as a primary key to uniquely identify records in the table.

FIG. 7B illustrates a value proposition table that the marketer can use to contact selected potential customers. For each value proposition listed in column 71b, e.g. a 20% off coupon or a 40% off coupon, column 71a displays an identification key.

The table of the embodiment of FIG. 7B also features enhanced flexibility, in that more than one behavior type can be monitored for each value proposition, as shown in column 71c. For people who receive the 20% off coupon, the marketer may wish to monitor purchases and/or inquiries about clunky shoes. For the people who receive the 40% off coupon, the marketer may also desire information on non-responders. Column 71c may include estimated return contributions associated with each behavior (e.g., income less cost of goods sold). In another embodiment, the estimated return can be included as another field in the behavior table of FIG. 7A. For example, a purchase may result in a return of $20 but an inquiry provides a return of $0. (Other information may be included, such as cost of making an offer, e.g., cost of making a coupon.)

FIG. 7C illustrates an example offer cell table, which is linked to the value proposition table. Each offer cell contains an identification key listed in column 72a in conjunction with a particular value proposition, listed in column 72b. In this example, the 20% and 40% off coupon are identified with identification keys 300 and 301 respectively. Value proposition identification keys are included in column 72c which can be used as a linking mechanism to a value proposition table (FIG. 7B). In another embodiment, an offer cell may be linked to multiple value propositions (such as mailing multiple coupons).

Implied attribution information (e.g., rules for when to imply behavior is the result of a contact) may also be included in an offer cell table. In this example, attribution is implied if the behavior is exhibited within an input window of time. The predetermined time frame of the attribution, or evaluation period, can be incorporated into the offer cell in column 72d. In this example, the evaluation period is defined from the extract date, which is the date that the extract is formed in the campaign process. The extract date may define the date the offer cell was performed, e.g., the date a coupon was mailed (with an assumed delay time). An additional delay time may be input to account for mailing time or other unavoidable delays that may hinder a customer from responding immediately. A campaign involving telephone calls may begin the evaluation period on the same day as the phone call, with no delay time required. The evaluation period may be defined in a number of other ways, such as by the direct input of dates. In this example, offer cell 300 has an evaluation period of 90 days which begins 10 days after the extract date.

The tables are not limited to the fields shown in FIGS. 7A-C. For example, the offer cell table can include financial information such as the cost of contacting each individual with a particular offer cell. In addition, the same or similar information may be stored in different ways.

Examples of graphical interfaces for inputting information for the behavior, value proposition and offer cells are shown in FIGS. 7D-L. These examples are intended for illustrative purposes only and any type of graphical interface (e.g., provided by software running on a general computer) can be used.

Figure 7D:
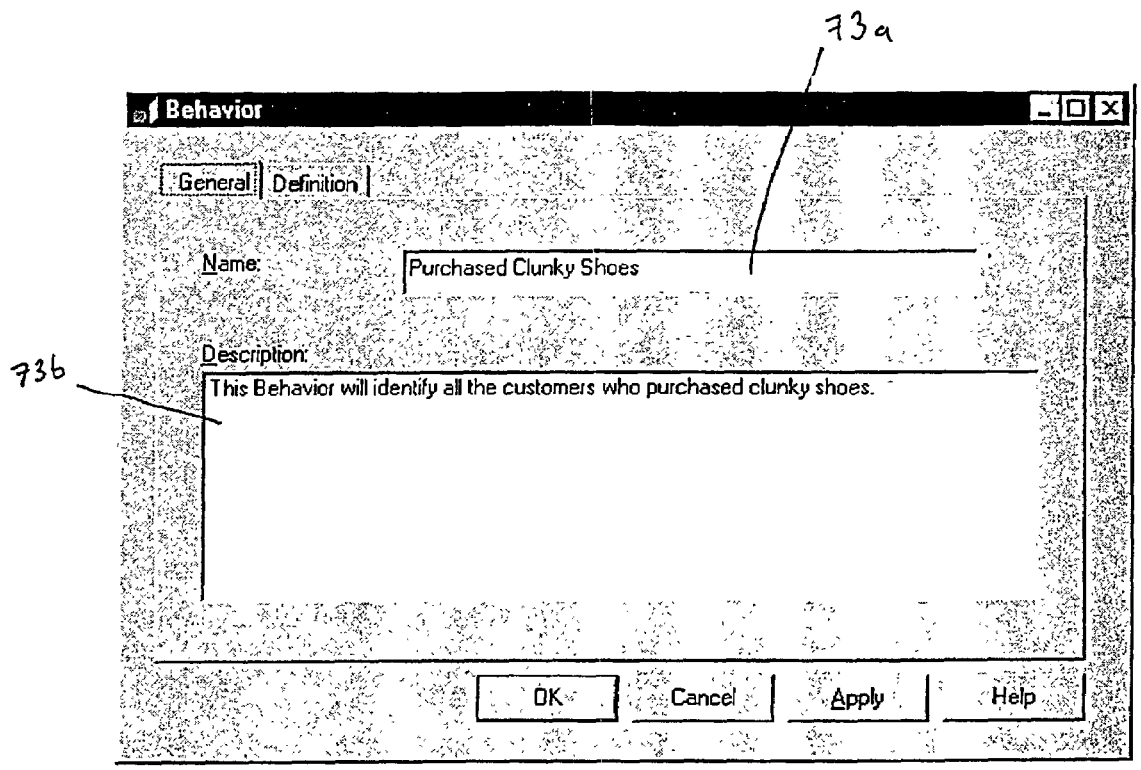
FIG. 7D illustrates an example of a graphical interface for defining behavior data.

FIG. 7D displays an example interface for the formation of a behavior table (e.g., the one in FIG. 7A) where behaviors can be added and defined. The behavior type is named in field 73a and a more detailed description can be added in field 73b.

Figure 7E:
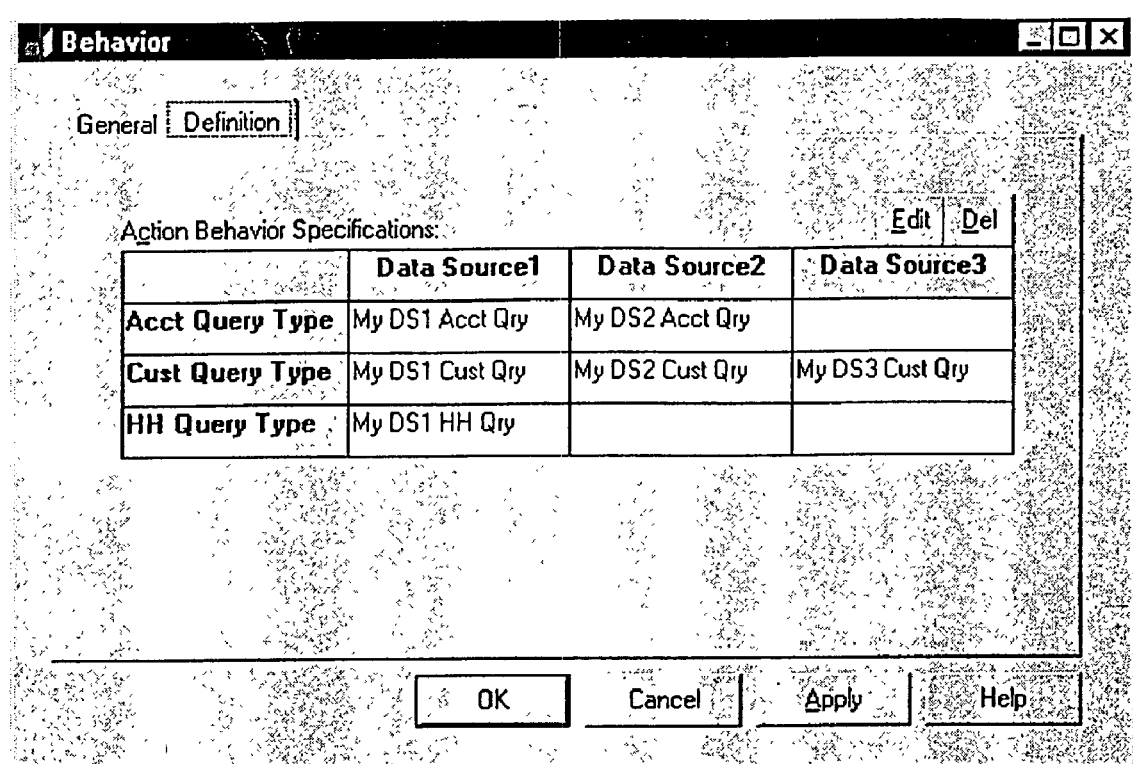
FIG. 7E illustrates an example of a graphical interface to assist accessing behavior data.

FIG. 7E illustrates a graphical user interface allowing input of behavior data information that allows access to information in a behavior data table (e.g., the table of FIG. 10A, below). The interface allows input of one or more queries for each data source (e.g., multiple behavior tables). Thus, the input queries may specify how to identify purchase of clunky shoes in a first data source and (separately) queries to identify that behavior in a second data source. Similarly an additional screen may be provided to identify other fields of interest in the input behavior data (e.g., the behavior table of FIG. 10A), such as how to access action dates for a behavior (e.g., the date on which clunky shoes were bought).

Figure 7F:
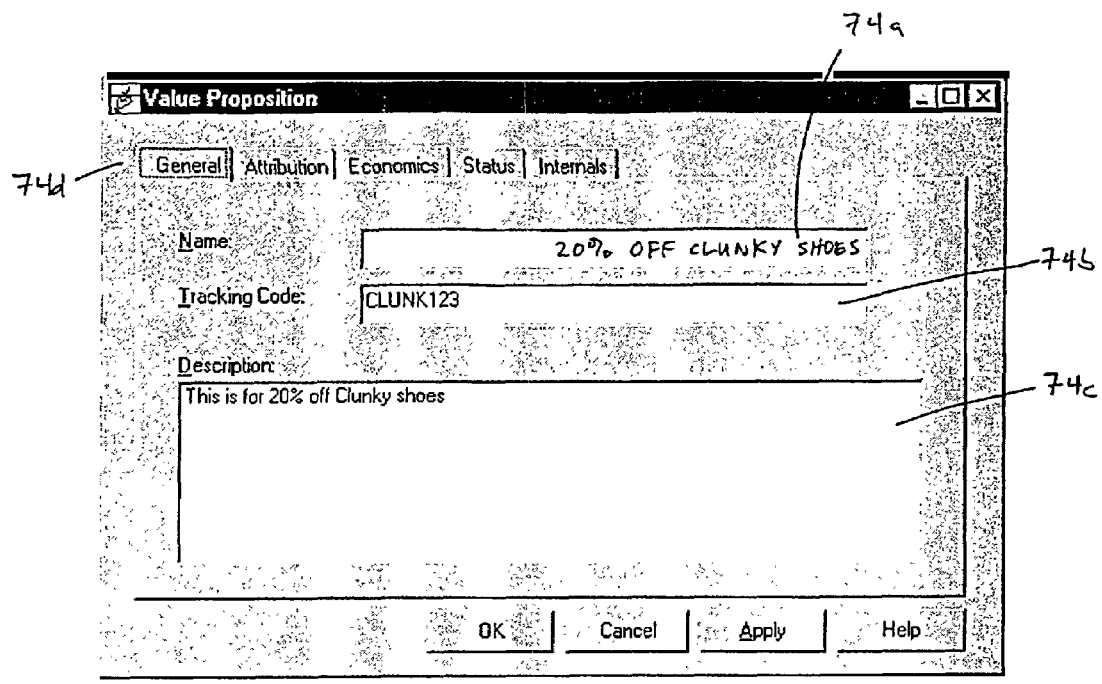
FIG. 7F illustrates an example of a graphical interface for defining general value proposition data.

FIG. 7F displays an example interface for the formation of a value proposition table (FIG. 7B). Tabs 74d allow the user to access different input types. Field 74a allows a user to input a value proposition name and a more detailed description for that value proposition can be added in field 74c. Field 74b can contain a tracking code to permit tracking of data related to this value proposition.

Figure 7G:
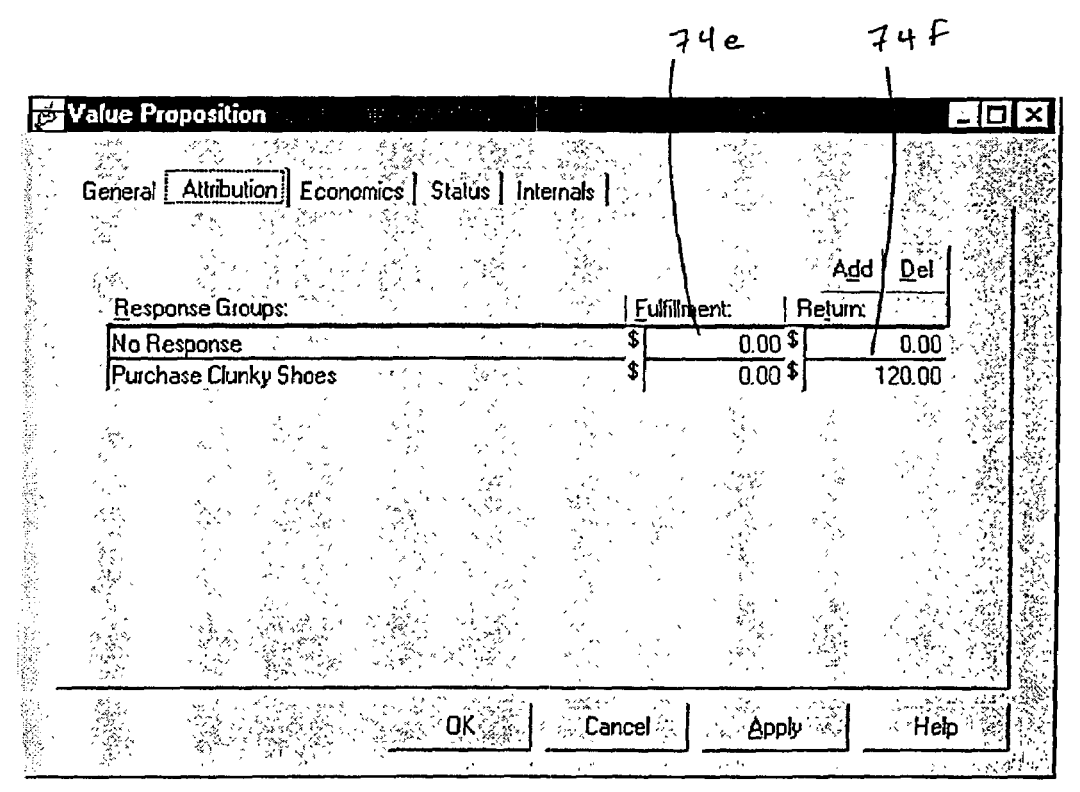

FIG. 7G displays an example interface that allows the user to input financial estimates involved for a value proposition. A user can provide estimated fulfillment and returns in fields 74e and 74f respectively.

Figure 7H:
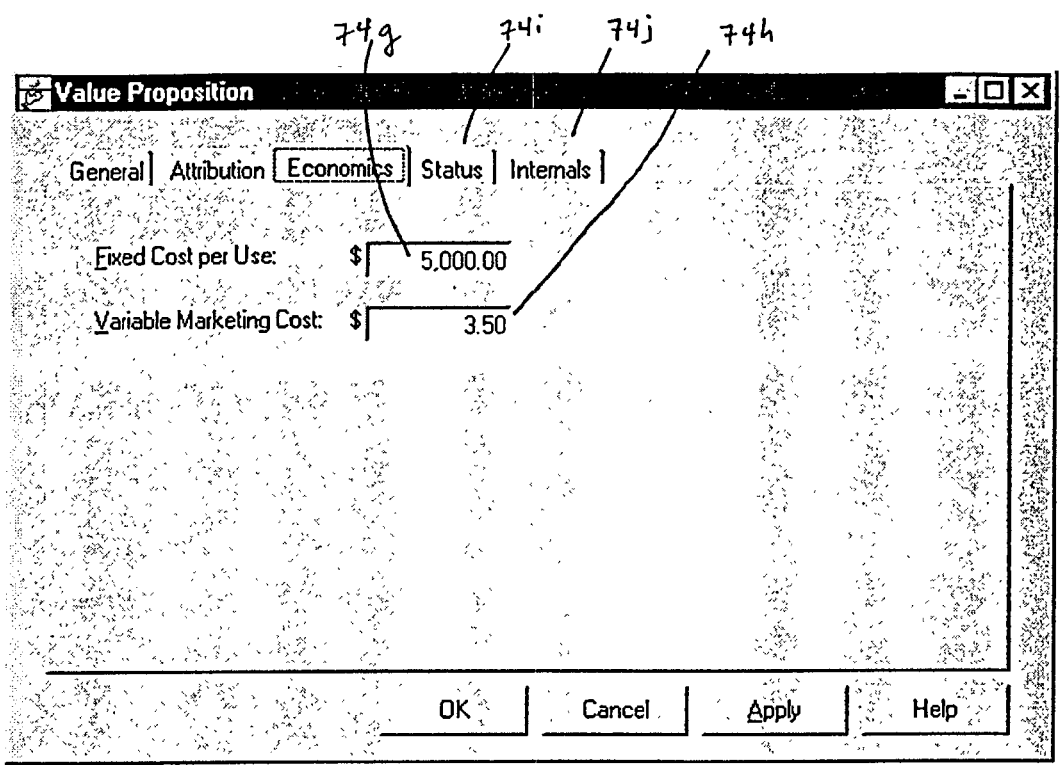
FIG. 7H illustrates an example of a graphical interface for defining economic value proposition data.

FIG. 7H displays an example interface that allows the user to input economic costs involved in carrying out a value proposition. For example, a user can track fixed (minimum cost) and variable costs (cost per unit) which can be input separately via fields 74g and 74h. Other fields may be provided for programming use (such as object identifier), available by tabs 74i and 74j.

Figure 7I:
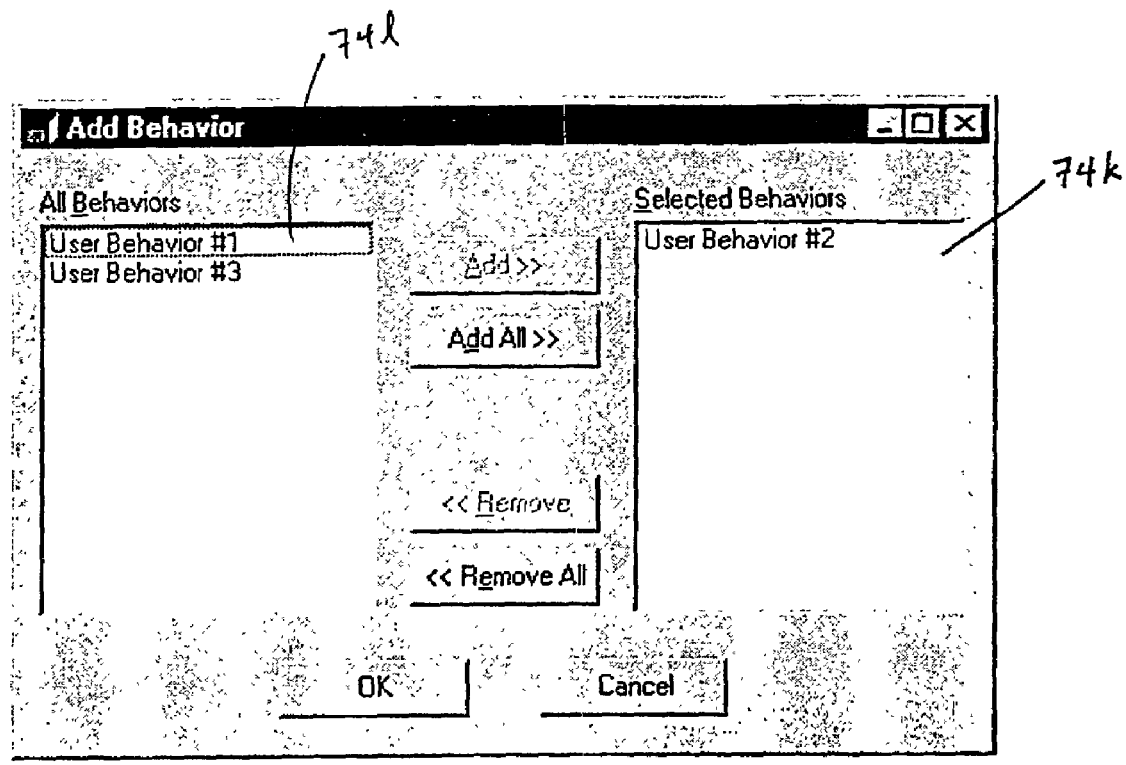
FIG. 7I illustrates an example of a graphical interface for linking targeted behaviors with value propositions.

FIG. 7I displays an example interface that allows the user to connect target behaviors with a value proposition, as previously discussed with reference to column 71c of FIG. 7B. In FIG. 7I, a list of possible behaviors can be displayed in field 74l. These behaviors may be all the behaviors in a master behavior table, or a user can add any possible behaviors to be monitored in relation to each particular value proposition. In field 74k, the user can select the specific behaviors to be monitored in connection with the value proposition.

Figure 7J:
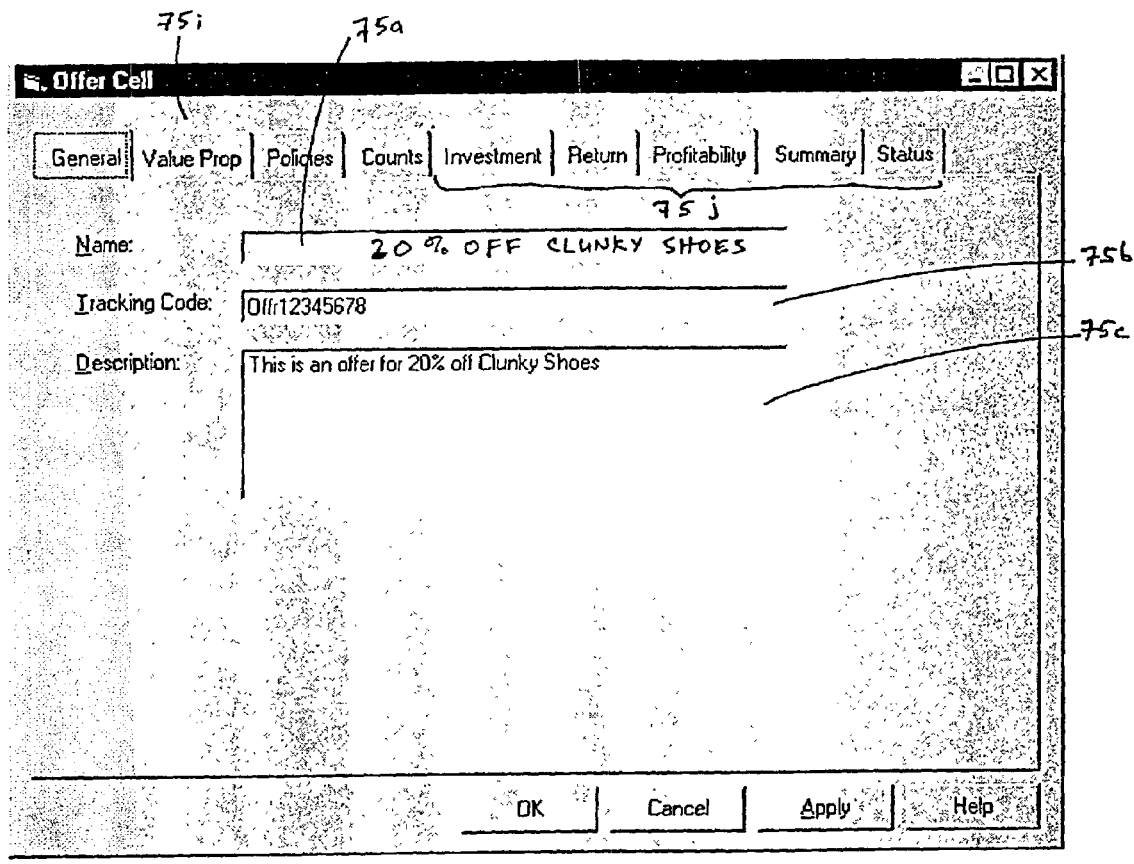
FIG. 7J illustrates an example of a graphical interface for defining general offer cell data.

FIG. 7J displays an example interface that allows the user to define offer cells. The offer type can be named in field 75a and a tracking code provided in field 75b. A more detailed description of the offer cell may be added in field 75c. Tab 75i may access an interface allowing the user to specify the value proposition associated with the offer cell. Tabs 75j allow a user to input economic tracking data such as: potential contact count, estimated contact count (number of people contacted), marketing costs (including totals for a specified contact count), cost information, estimated return rate (successes) and return amount, and values computed from these numbers, such as estimated total return from offer cell, estimated total costs and profitability.

Figure 7K:
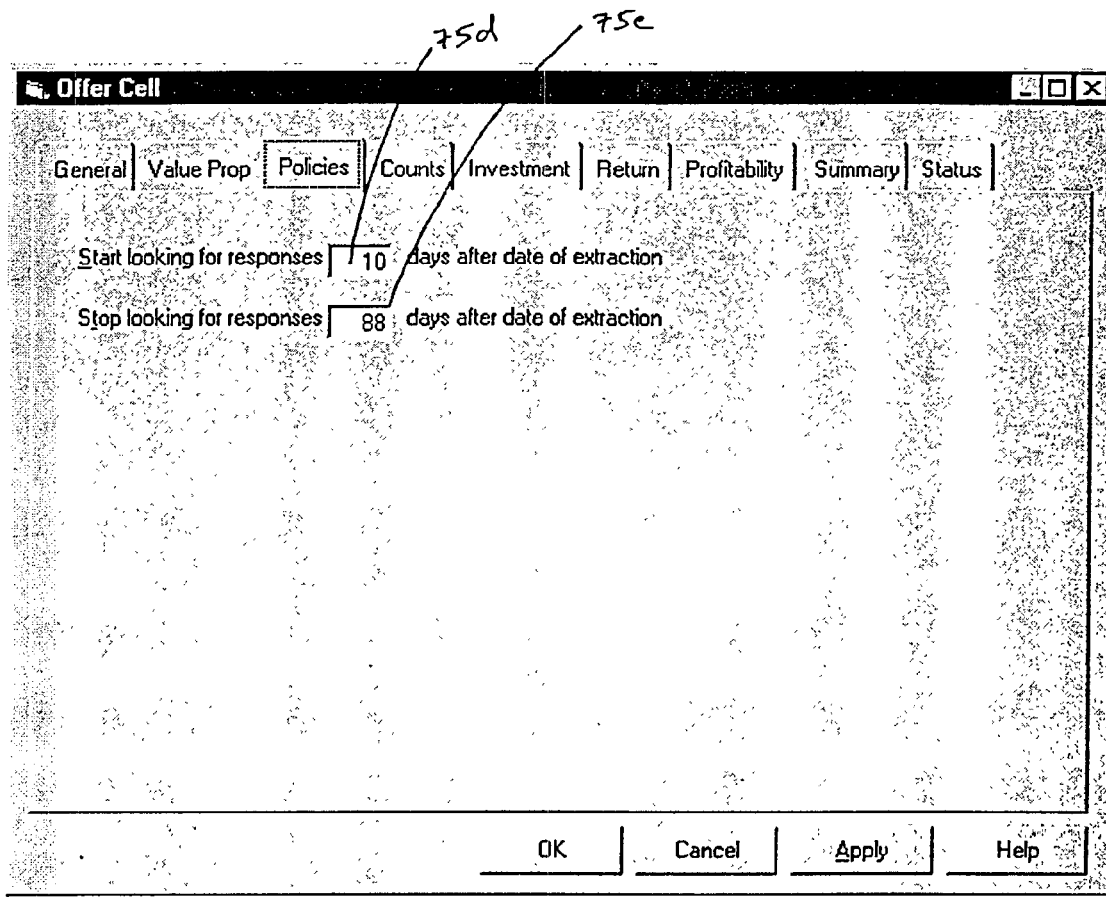
FIG. 7K illustrates an example of a graphical interface for defining an evaluation time period.

FIG. 7K displays an example interface for defining evaluation periods for implied attribution. The delay time can be input in field 75d and a total evaluation period can be defined in field 75e.

Figure 7L:
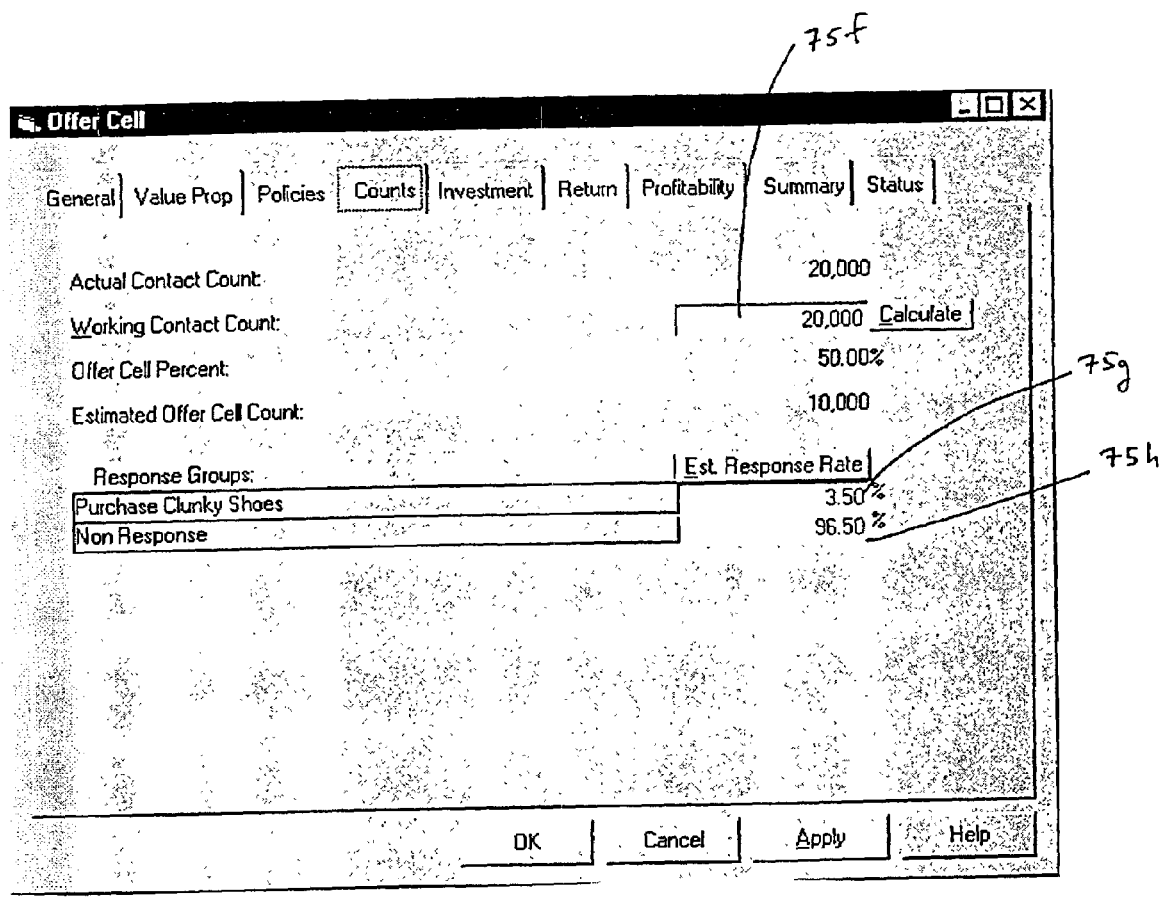
FIG. 7L illustrates an example of a graphical interface for defining contact group data in connection with each offer cell type.

FIG. 7L displays an example interface that allows a user to connect the contact group information with each offer cell. For example, a marketer wishes to determine how many people are to be contacted, and a number can be input in field 75f. Response and nonresponse estimates can be provided in fields 75g and 75h respectively. These estimates can be guesses or obtained from the results of previous campaigns. Economic factors may determine the contact group number and these can be tracked concurrently during attribution.

The arrangement of linked tables featured in FIGS. 7A-C allows a marketer to maintain large or flexible master databases of behaviors and/or value propositions, where each behavior and value proposition is tracked by a unique key. This arrangement may be useful for businesses that deal with a variety of products and have multiple campaigns in progress, or campaigns including multiple types of offers. The planning or attribution process, however, does not necessarily require this linking arrangement. In another embodiment, there can be one large input table where a user directly inputs each variable necessary for the campaign. Other embodiments may comprise various other types of linking arrangements. As discussed previously, the fields for each table are not intended to be limited to those shown in the examples and the attribution system may allow user flexibility in defining fields.

Figures 8A, 8B:
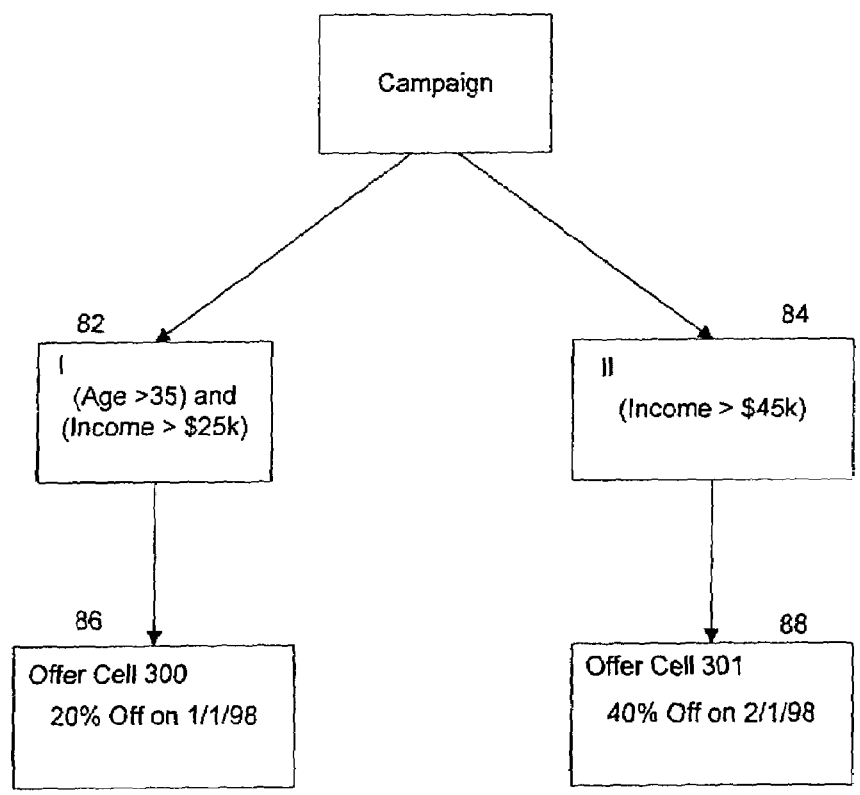
FIG. 8A illustrates an example of a campaign.
FIG. 8B illustrates an example of a database of possible contacts for a campaign.

Referring to FIG. 6, a campaign plan is formed at step 60. FIGS. 8A and 8B illustrate an example of a campaign. A campaign plan involves the selection of a group (or groups) of entities to promote (e.g., recipients of a mailing). The selection may be carried out by formulating a query, as described above with reference to campaign management generally. The query example in FIG. 8A is designed to select two contact groups, although any number of contact groups can be selected. In this example, one query 82 selects contact group I comprising people (heads of households) over the age of 35 and having an income greater than $25,000. Contact group II comprises anyone (heads of households) with an income greater than $45,000, as shown in step 84.

FIG. 8B illustrates a database of possible contacts for a marketing campaign. The query process illustrated in FIG. 8A may be run against the database of FIG. 8B, in order to select individuals to receive one of the two, both or none of the offer cells 86, 88 (of course, in the example of FIG. 8B, other information pertaining to potential contacts can be included, such as demographic information, profession and other information).

In the example of FIG. 8B, individuals A-E, G and H satisfy the requirements of either Group I or II and will receive the corresponding offers. (As identified in FIG. 9.) Individuals I-K will not be promoted to because I is too young and J and K do not have sufficient income. Individuals C and G satisfy the requirements to be in both contact groups I and II and thus C and G will be contacted with both types of offer cells 86, 88. Thus, the query resolution process (step 61) will identify which individuals (the rows of FIG. 8B) receive which (if any) of offers 86, 88.

Referring back to FIG. 6, step 61 represents the execution step. The individual contacts are associated with the offer cells, as described with reference to FIGS. 8A and 8B. During this process a promotion history table may be constructed. In this embodiment, the promotion history table stores the history of contacts in the campaign.

FIG. 9 shows an example of a promotion history table for the example of FIGS. 8A and 8B. In this example, column 90 lists the offer cell identification key, column 92 lists customer names or identification key, and column 94 lists the extract date. A different extract date may be provided for different offer cell types—depending on when the offer was made. As shown in row 91*a*, individual A, a member of contact group I, receives a 20% off coupon in connection with offer cell 300 which has an extract date of January 1. From the offer cell type (FIG. 7C), the evaluation period may be determined, which covers the dates of January 11 (January 1+delay of 10 days) to April 1 (total evaluation period=90 days). Because individuals C and G are members of both Groups I and II, C and G are listed twice and are assigned both offer cells no. 300 and 301(rows 91*b*-91*e*). As with the other tables, the fields displayed in the promotion history table of FIG. 9 are illustrative and can include other information. For example, the marketer may have performed a query based on demographics and this information can be included in the promotion history table. In addition, the information may be stored in other formats.

Table III schematically illustrates how the fields of each record of a promotion history table can be defined.

TABLE III

| FIELD NAME | DATA TYPE | KEY | Description |
|---|---|---|---|
| <OFFER_CELL_FIELD_1> | <TYPE> | PK | First Field in group that Uniquely Identifies Offer Cell |
| <OFFER_CELL_FIELD_2> | <TYPE> | PK | Second Field in group that Uniquely Identifies Offer Cell |
| . . . | | | |
| <OFFER_CELL_FIELD_N> | <TYPE> | PK | Last Field in group that Uniquely Identifies Offer Cell |
| <EXTRACT_DATE> | DATE | PK | The extract date of the offer cell. |
| <RECIPIENT_ID> | <QT ID> | PK | The identifier of the recipient of the contact (e.g. Customer ID). The data type corresponds to the data type of the query type ID. |
| . . . | | | Promotion History can contain many other fields |

As discussed previously, the offer cell type is connected to a particular contact group, each member being defined here with a recipient ID. Any method for defining the contact group can be used and other information can be located within the promotion history table.

Referring back to FIG. 6, step 62 represents the beginning of the assessment step, where customer behavior is monitored and input to the system. The customer behavior monitored should include the behaviors of interest. For example, the monitored behavior may include purchases of shoes and store inquiries. This may be performed by the business performing the campaign, such as by keeping sales records.

The customer behaviors can be formulated for input into an automated system in a variety of ways. One such way is to formulate a database that includes the behavioral information. Thus, a database that lists all sales of clunky shoes could be input to the system. Such a database may, however, include substantial information beyond that of interest for any one particular campaign. For example, different stores selling clunky shoes may sell other products, and the total sales for all the products over the course of a year can be tabulated in a master store database.

A database (or table in a database) that includes the behavior data may be referred to as a "behavior data table." More than one behavior data table may be useful for a given assessment, or all the data could be combined into one table.

FIG. 10A shows an example of a behavior data table such as a sales table from a shoe store, which may be used in assessment of the campaign of FIGS. 8A and 8B. Column 100 identifies the customer, the product is listed in column 101 and the date of purchase is listed in column 102.

FIG. 10B lists an inquiry table for the same shoe store. Both tables in FIGS. 10A and 10B may also contain other information on targeted and non-targeted customers.

Thus, FIGS. 10A and 10B are behavior data tables that may be used in assessing the campaign of FIGS. 8A and 8B. FIG. 10A includes purchase information for the shoe store and FIG. 10B shows inquiry information for the shoe store. Of course, these tables could be combined into one table or stored in any other manner.

Returning to FIG. 6, step 63 represents an implied attribution step. Implied attribution may be performed for each behavior type.

Figure 11:
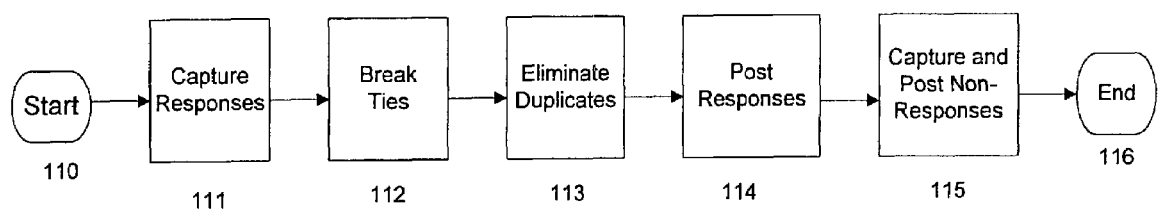
FIG. 11 illustrates one example for performing implied attribution.

FIG. 11 illustrates one embodiment of a method for performing implied attribution. The start of the attribution 110 may include initialization of the process such as accessing various data sources, such as the sales and inquiry tables of FIGS. 10A and 10B and any other relevant information.

At a step 111, responses are captured. In this embodiment, this step involves identifying which of the records in a behavior table are attributable to contacts in a promotion history table. One embodiment of a method for performing this step 111 is described in greater detail below with reference to FIGS. 12A-12C and 13. The process may be referred to as attributing behavior records to offers or offer cells. This reference herein and in the claims is intended to include attributing behavior records to a contact group for the offer, or contacts within the contact group.

At a step 112, ties are broken. During the step 111, a single behavior might be attributable to more than one contact. For example, if a customer purchases a pair of shoes after having both received a catalog and a 10% off coupon, the response (purchasing shoes) might be attributable to either of the contacts. At the step 112, ties are resolved.

At a step 113, duplicates are eliminated. This step may be performed where the implied attribution process is run repeatedly. Eliminating duplicates would prevent subsequent posting of information which is already included in a results (or response) table.

At a step 114, the attributed responses are posted (e.g., to a results or response table). This represents providing feedback on the implied attribution process.

At a step 115, nonresponses are posted. This involves capturing those contacts which did not result in any positive behavior. Step 115 is also described in greater detail below.

Finally, at a step 116, the implied attribution process is complete.

Figure 12A:
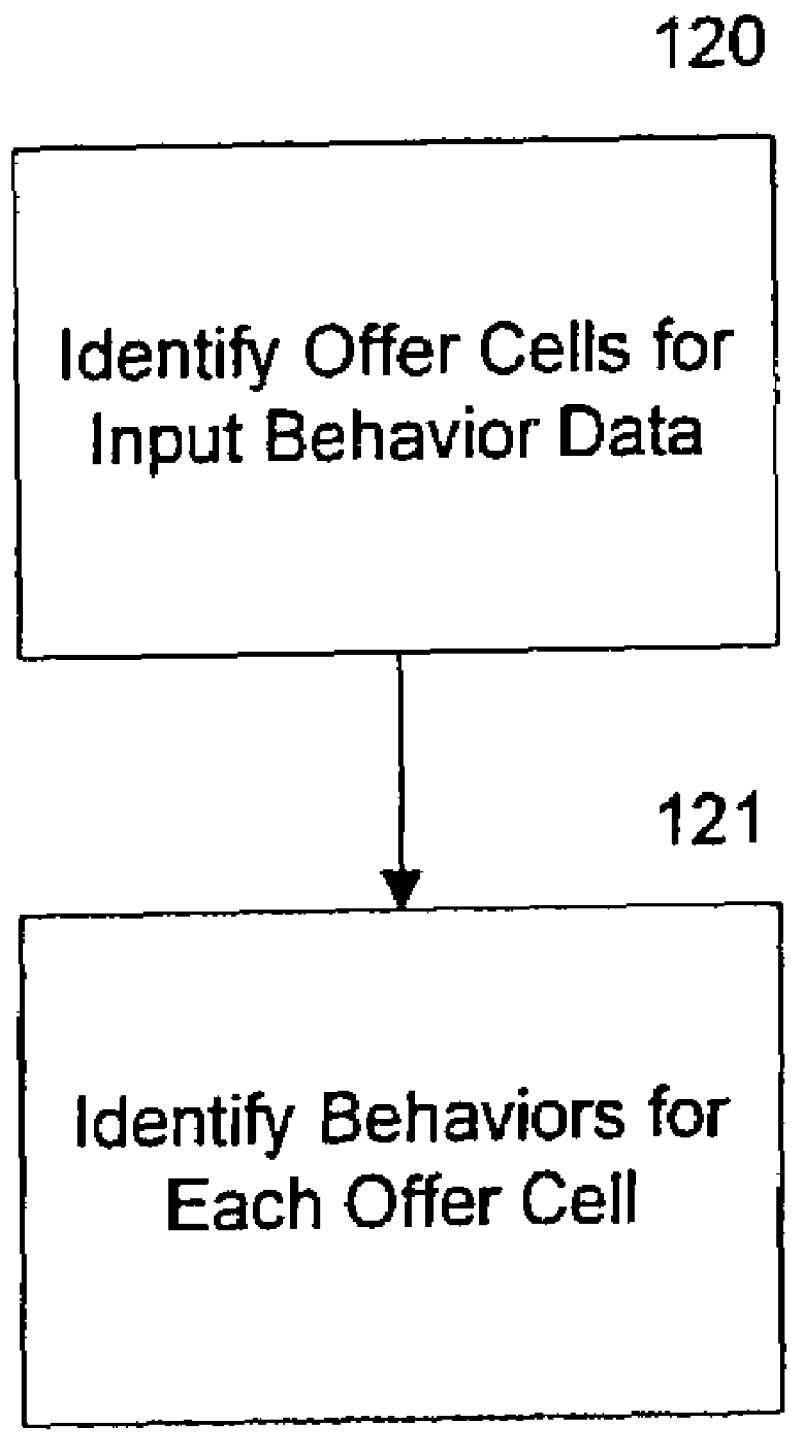
FIG. 12A illustrates an example of a general process for capturing responses.

FIG. 12A illustrates one embodiment of a general process for capturing responses (step 111 of FIG. 11).

At a step 120, the relevant offer cells of the campaign are identified (this analysis is shown in greater detail in FIG. 12B). A variety of input behavior data may be provided. At step 120, those offer cells (and corresponding contacts) which might result in the behavior reflected in the behavior table are identified. The implied attribution process may only need to be performed for offer cells that may result in the monitored behavior; offer cells that target only behaviors that have not been monitored cannot be assessed for a set of input behavior data.

At a step 121, the specific behaviors (e.g., records within the behavior table) that are attributable to the offer contacts of the identified offer cells are identified. Thus, the records in the behavior table that may be attributable to a particular contact are identified and associated with the applicable contact. One embodiment of a method for performing step 121 is described with reference to FIG. 12C.

In FIG. 12B, one method of identifying offer cells (step 120) is shown. Each type of behavior reflected in the behavior table is identified in step 120a. For example, the sales table of FIG. 10A shows three types of behaviors: the purchase of clunky shoes, the purchase of sneakers and the purchase of boots.

Step 120b of FIG. 12B identifies the value propositions targeting the behavior data obtained from step 120a. Continuing the example, the purchase of clunky shoes was promoted by the mailing of 20% off and 40% off coupons. The value propositions may be identified by searching the table of value propositions in the system. For example, referring to FIG. 7B, the value propositions that include a behavior identifier corresponding to the behaviors identified in the behavior table may be selected. In this case, both of the value propositions in FIG. 7B target behavior 100, which is purchase of clunky shoes. (Purchase of any other type of shoe reflected in the table, such as sneakers, was not targeted in this campaign and no corresponding value proposition is identified for that behavior data.) Since this behavior data is included in the behavior table of FIG. 10A, both of these value propositions would be selected.

Step 120c then connects these value propositions with the offer cells in the campaign(no. 300 and 301, respectively). Thus, the specific offer cells that may have resulted in the targeted behavior (included in the behavior table) are identified.

Figure 12C:
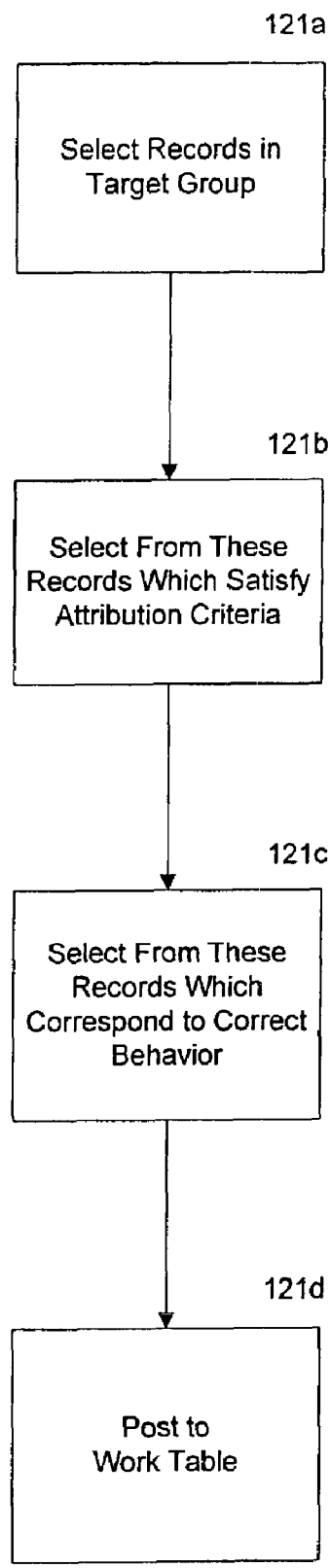
FIG. 12C illustrates an example of attributing behavior for identified offer cells.

After the offer cells have been identified, step 121 of FIG. 12A involves attributing behavior for the identified offer cells. One embodiment of a method for doing this, for one offer cell, is shown in FIG. 12C. The method in FIG. 12C may be performed for each offer cell.

At a step 121, the records in the behavior table are selected that correspond to the target group for the offer cell being analyzed. In some cases, this corresponds to selecting those records in the behavior table that correspond to a person contacted by the offer cell. For example, each individual in the promotion history table that received this particular offer cell may be correlated with the individuals in the behavior table.

Step 121a may include an analysis of a broader group than just those people contacted using that offer cell. In particular, the target group may include people in addition to the contacts. As described above with reference to FIG. 5, for example, the person contacted may be a head of household. The target group may include all of the people within the household. In this case, the records in the behavior table are selected if they correspond to the actual person contacted or anyone in that household, i.e., records in the behavior table are selected if they correspond to an individual in the target group.

At a step 121b, the inquiry is further refined. Here, records are selected which satisfy the attribution criteria. In the above example, the attribution criteria is that the targeted behavior occur within a certain period of time of the offer cell. For example, in the mailing of 20% off coupon, the attribution criteria may be that the behavior be exhibited at least ten days after the contact, but no more than 90 days after the contact. Other, more sophisticated attribution criteria could be employed.

At a step 121c, the records which correspond to the correct behavior are selected. Thus, for example, only records that correspond to purchase of clunky shoes may be selected when a 20% off clunky shoes coupon is mailed—attribution may not be performed for behavior that was not targeted by the offer cell.

Finally, at a step 121d, the results are posted to a work table. The work table is a separate area of computer memory for storing temporary results.

Although the process of FIG. 12C is illustrated as a sequential sorting through and filtering of records in the behavior table, there are a variety of ways in which this may implemented. As just one example, queries may be formulated corresponding to each (or all) of the filtering steps. The query may then be run using conventional database techniques against the behavior table. In another embodiment, each record could be examined to see if it meets all of the criteria as set forth in FIG. 12C for implied attribution. In other embodiments, similar methods may be employed, but beginning with individual contacts and identifying which behavior records are attributable to the contacts.

An example of the method of FIG. 12C is shown in FIG. 13, which shows an analysis of the sales table of FIG. 10A for the promotion history table of FIG. 9. The example table is for illustrative purposes only, although this table can be generated if desired. Step 121a identifies records in the target group (here, this is just the contact group—individuals in the promotion history table), resulting in the discounting of any data relating to individual F, who was not promoted to. At step 121b, records are discarded if not attributable to the offer cell. Thus, although individuals A and B purchased clunky shoes, the purchase occurred before and after, respectively, the evaluation period of January 11 to April 1 (the evaluation period, in this embodiment, being included in the), and this data will not be considered. Purchases for the products other than clunky shoes also will not be attributed (step 121c).

All positive results, i.e., purchases that were made by target group members for promoted products within the evaluation period, can be posted into a work table. The work table is generated every time an attribution is run and can function as a temporary table. In another embodiment, the work table can be a permanent table.

FIG. 14 shows an example of a work table for the above campaign. Columns 140 to 142 list the customer, product purchased and date purchased, respectively, and column 145 indicates the offer cell type (by identification key). From the work table, a marketer can quickly evaluate which offer cell was successful in causing a product purchase. The work table can also include lag days, column 144, which enumerates the number of days from the evaluation start date (e.g., the extract date plus a delay period) that the product was purchased. The fields of the work table are not limited to those shown in the example and can include other information such as profits or promotional costs.

Other fields for the records of the work table may be included, such as those shown in Table IV.

TABLE IV

| Field Name | Data Type | Key | Description |
|---|---|---|---|
| <OFFER_CELL_FIELD_1> | <TYPE> | PK, FK | First Field in group that Uniquely Identifies Offer Cell |
| <OFFER_CELL_FIELD_2> | <TYPE> | PK, FK | Second Field in group that Uniquely Identifies Offer Cell |
| <OFFER_CELL_FIELD_N> | <TYPE> | PK, FK | Last Field in group that Uniquely Identifies Offer Cell |
| <EXTRACT_DATE> | DATE | PK, FK | The extract date of the offer cell. |
| <RECIPIENT_ID> | <QT ID> | PK, FK | The identifier of the recipient of the contact (e.g. Customer ID). The data type corresponds to the data type of the query type ID. |
| RESPONDER_ID | <QT ID> | PK | The identifier of the responder to the contact (e.g. Customer ID). The data type corresponds to the data type of the query type ID. |
| BEHAVIOR_GROUP | INTEGER | PK | The unique identifier within Cell to index response groups |
| RESPONSE_DATE | DATE | PK | The date of the response. |
| BEHAVIOR_ID | INTEGER | FK | The unique identifier of this behavior. |
| RESPONSE_LAG_DAYS | INTERVAL | | The number of days between the extract date and the response date. |
| TIEBREAKER_WINNER | CHAR (1) | | Indicates whether or not his record is the "winner" (best record) in the tiebreaking process (or was not tied with another offer). "Y" indicates winner, "N" otherwise. |
| FULFILLMENT_COST | DECIMAL | | The actual cost to fulfill this response. For example, if the behavior is "request catalog" the fulfillment cost would be the cost of the catalog plus shipping costs (etc.). |
| RETURN_CONTRIB | DECIMAL | | The actual value of this response. For example, if the behavior is "purchase shoes," the return contribution might be the revenue minus the cost of goods sold. In other cases, it could be the net present value of the purchase or the increase to lifetime value. Each installation decides on their measure of value. |

TABLE IV-continued

| Field Name | Data Type | Key | Description |
| --- | --- | --- | --- |
| <AT_KEY_1> | <ATK1_TYPE> | | Field 1 in the Action Table's Primary Key. |
| <AT_KEY_2> | <ATK2_TYPE> | | Field 2 in the Action Table's Primary Key. |
| . . . | | | |
| <AT_KEY_N> | <ATKN_TYPE> | | Field N in the Action Table's Primary Key. |

The work table contains information in connection with each offer cell type for each behavior group. The primary keys, the function to be explained below, can be defined here.

Referring again to FIG. 11, after the responses have been captured, (and, in this embodiment, stored in a work table) step 112 involves a tiebreaker step. A tiebreaker step can be performed if the marketer wishes to attribute each purchase to only one offer cell. For example, in the worktable of FIG. 14, individual C is listed twice for the purchase of one pair of clunky shoes, because C was promoted with two different offer cells and the behavior (buying shoes) could be attributed to either offer. A tiebreaker process may select one offer cell as causing the desired behavior and discount the data relating to the other offer cell for the same purchase.

Figure 15:
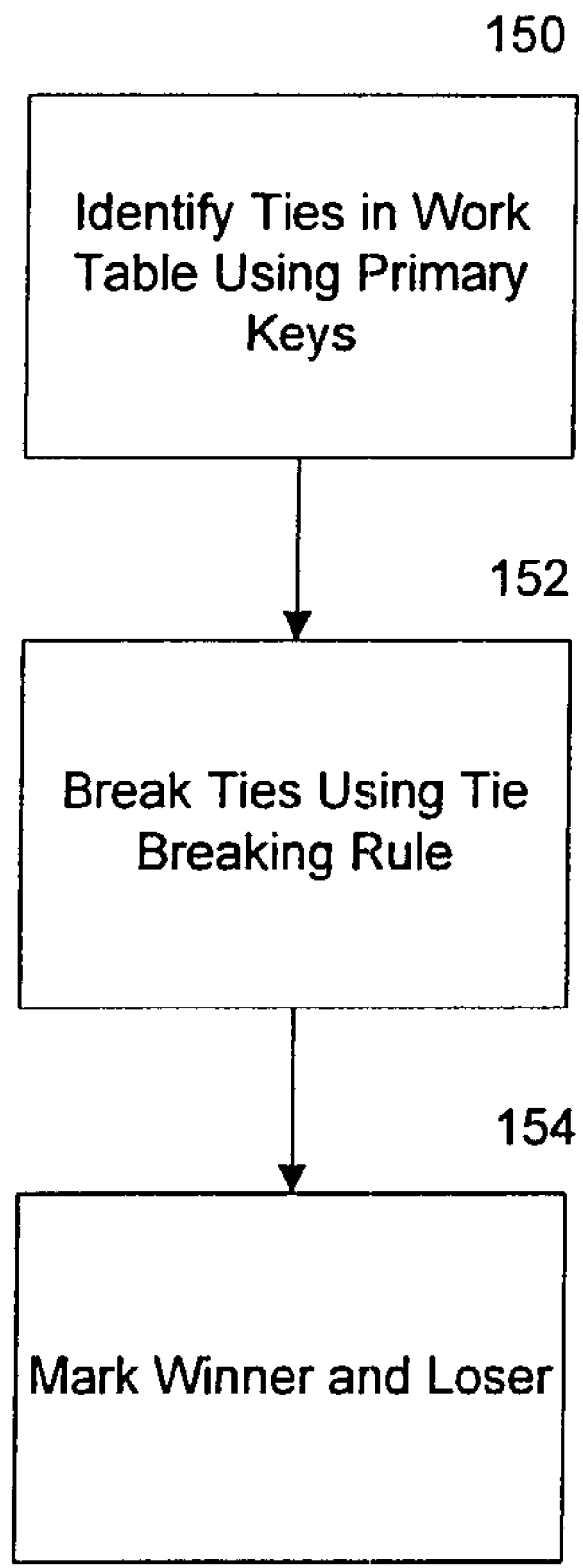
FIG. 15 illustrates an example of a process for breaking ties.

FIG. 15 shows the steps involved in one embodiment of a tiebreaker process. In step 150, any ties in the work table are identified by "primary keys," which comprise a combination of data that uniquely identify each purchase. For example, in FIG. 14, ties can be uniquely identified by primary keys 146 comprising data in columns 140-142. For individual C's purchase, the primary keys for both offer cells will be read as precisely matching each other, and by this method the tie is identified.

The process of FIG. 15 then employs a tie breaking rule in step 152 to select one offer cell which is marked as the "winner" in step 154. The tie breaking rule can involve a variety of methods including a random selection process, or a ranking scheme where one offer cell is assigned a higher ranking than other offer cells promoting the same product.

In the example of FIG. 14, the offer cell having a later extract date is assigned a higher ranking. By this rule, offer cell 301 is chosen as a "winner." Column 143 of FIG. 14 lists the results of the tiebreaker process. As indicated in FIG. 14, column 143, a field may be associated with each record indicating whether the field is a tiebreaker winner. The field may be set to yes for both winners of tiebreakers (e.g., row 147) and also for rows which are not involved in a tiebreaker (e.g., row 148) where the behavior is attributable to the contact by default. Thus, only tiebreaker losers would retain a "no" entry in the applicable column 143, as in row 149.

Results contained in the temporary work table may be transferred to a permanent results table or a response table, shown in the post responses step 114 of FIG. 11. Prior to posting the response, the attribution process may involve elimination of duplicate data, or "deduplication," at step 113. The deduplication step accounts for the fact that the attribution can be performed as many times as desired. The work table generated each time can contain all the data accumulated at that point in time and the results posted in the response table.

FIG. 16A shows a sample work table generated on January 17, containing an entry for individual D's purchase. This entry may be transferred from the work table to an ongoing response table.

FIG. 16B shows a sample work table generated on February 16 which includes not only the new entry of February 15, but also D's entry of January 17 (from FIG. 16A). A deduplication step can be performed prior to transferring the results to the response table, to prevent individual D's January 17 entry from being entered to the response table more than once. In another embodiment, the attribution can be designed to count data accumulated only from the last attribution to the present period, thus eliminating the need for a deduplication step. In another embodiment, a deduplication step may be performed on a response table that contains several repetitive entries. Other similar designs may be conceived to achieve the same effect.

FIG. 17A shows an example of a response table, after deduplication and with all data posted.

Table V is a schematic display of how the fields of a response table can be defined. The fields of records in the response table may include offer cell type, extract date, results of tiebreakers and financial estimates and cost information. Primary keys ("PK") can be defined here.

TABLE V

| Field Name | Data Type | Key | Description |
| --- | --- | --- | --- |
| <OFFER_CELL_FIELD_1> | <TYPE> | PK, FK | First Field in group that Uniquely Identifies Offer Cell |
| <OFFER_CELL_FIELD_2> | <TYPE> | PK, FK | Second Field in group that Uniquely Identifies Offer Cell |
| . . . | | | |
| <OFFER_CELL_FIELD_N> | <TYPE> | PK, FK | Last Field in group that Uniquely Identifies Offer Cell |
| <EXTRACT_DATE> | DATE | PK, FK | The extract date of the offer cell. |
| <RECIPIENT_ID> | <QT ID> | PK, FK | The identifier of the recipient of the contact (e.g. Customer ID). The data type corresponds to the data type of the query type ID. |

TABLE V-continued

| Field Name | Data Type | Key | Description |
| --- | --- | --- | --- |
| RESPONDER_ID | <QTKC> | PK | The identifier of the responder to the contact (e.g. Customer ID). The data type corresponds to the data type of the Query Type Key Column. |
| BEHAVIOR_GROUP | INTEGER | PK | The unique identifier within Cell to index response groups |
| RESPONSE_DATE | DATE | PK | The date of the response. |
| BEHAVIOR_ID | INTEGER | FK | The unique identifier of this behavior. |
| RESPONSE_LAG_DAYS | INTERVAL DAY | | The number of days between the extract date and the response date. |
| TIEBREAKER_WINNER | CHAR (1) | | Indicates whether or not his record is the "winner" (best record) in the tiebreaking process. "Y" indicates winner, "N" otherwise. |
| FULFILLMENT_COST | NUMERIC (10, 2) | | The actual cost to fulfill this response. For example, if the behavior is "request catalog" the fulfillment cost would be the cost of the catalog plus shipping costs (etc.). |
| RETURN_CONTRIB | NUMERIC (10, 2) | | The actual value of this response. For example, if the behavior is "purchase pumpomatic sneakers," the return contribution might be the revenue minus the cost of goods sold. In other cases, it could be the net present value of the purchase or the increase to lifetime value. Each installation decides on their measure of value. |
| LOAD_TIMESTAMP | TIMESTAMP | | The date of the start of the process that loaded this record to the table. |

Referring again to FIG. 11, it may be desirable to perform a step 115 of identifying and posting people who did not respond to a particular contact.

Figure 17B:
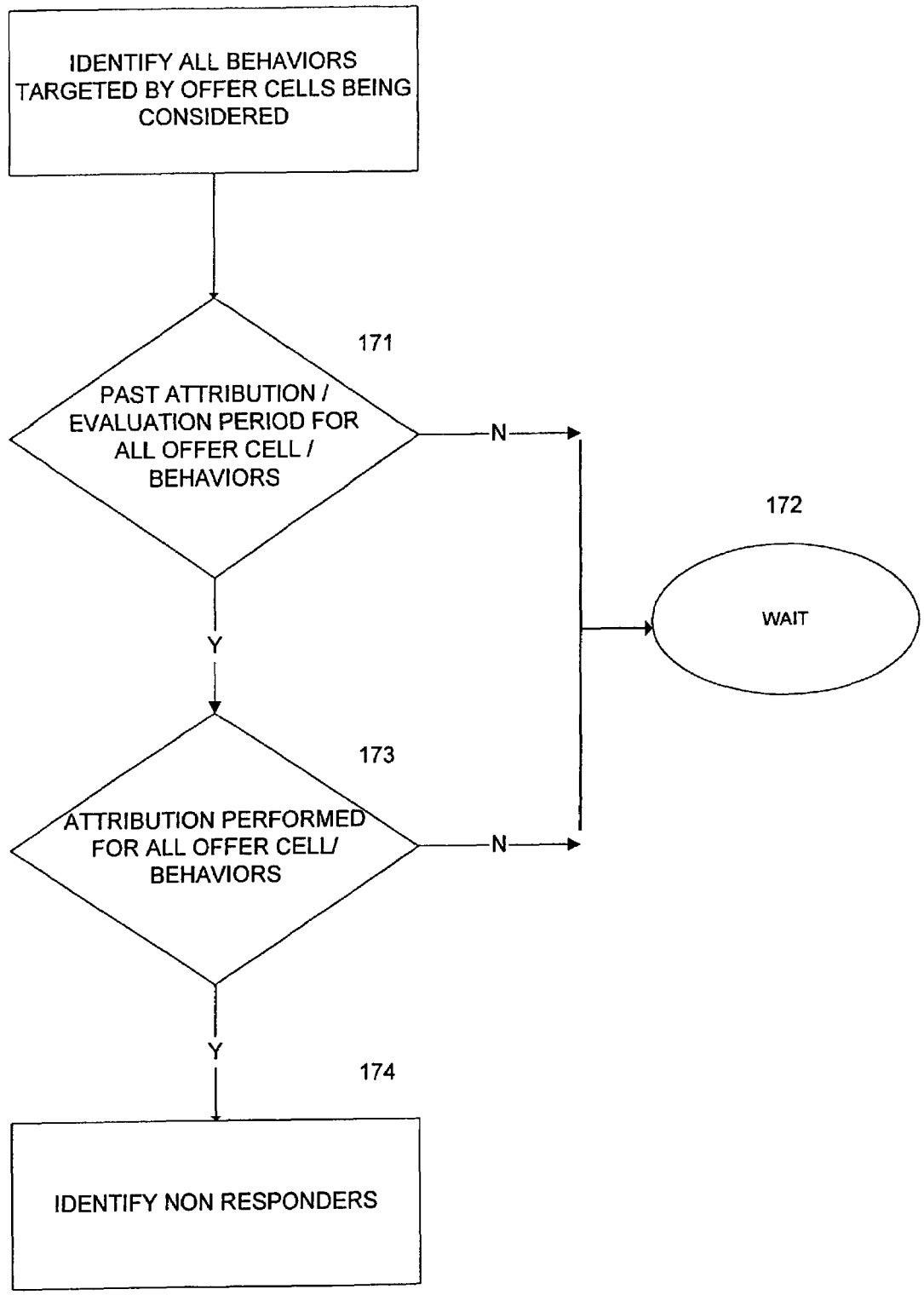
FIG. 17B illustrates an example of a general process for capturing nonresponders.

FIG. 17B illustrates one embodiment of the method for performing this step for one offer cell. This method may be applied to a single offer cell of interest or to all offer cells being attributed or to all offer cells in a campaign. At a step 170, the behaviors targeted by the offer cells being analyzed are identified. That is, it is determined what behaviors may result from the offer cell. By including all of the possible targeted behaviors (whether or not information about that behavior is available from the behavior table), one can assure that attribution has been performed for all of the responses. For example, if there were no information about a certain type of behavior targeted by an offer cell, it would not be possible to determine if any of the contacts responded with that type of behavior—accordingly, it would not be possible to determine whether any particular contact is a nonresponder (the contact may have responded with behavior that was not monitored). In this case, it may be desirable to delay determination of nonresponders (or, the determination of nonresponders may proceed with the knowledge that some of the identified nonresponders may have responded with an unmonitored targeted behavior).

At a step 171, it is determined whether the attribution/evaluation period for all offer cell/behavior combination has passed. For example, if the targeted behavior is purchase of clunky shoes and the evaluation period is ten to ninety days after the offer, it is determined whether that period has passed. If not, it may be too early to determine nonresponders—some contacts may yet respond within attributable behavior. Accordingly, at a step 172, it may be desired to wait until that period has passed.

If the attribution/evaluation period for all of the offer cells/behaviors has passed, at a step 173, it is determined whether attribution has been performed for all offer cells/behavior combinations. For example, it may be past the evaluation period for the sending of a coupon for purchase of clunky shoes, but the implied attribution process may not have been run since that period passed. As a result, even though the applicable time period has passed, the current response table was not up to date. Accordingly, it may be better to wait (step 172).

If attribution has been performed for all of the offer cell/behavior combinations since the applicable evaluation period has passed, then, at a step 174, nonresponders may be identified.

Step 174 may be performed by identifying all of the members of the contact group (identified in the promotion history table), which are not responders (are not in the response table).

Figure 18:
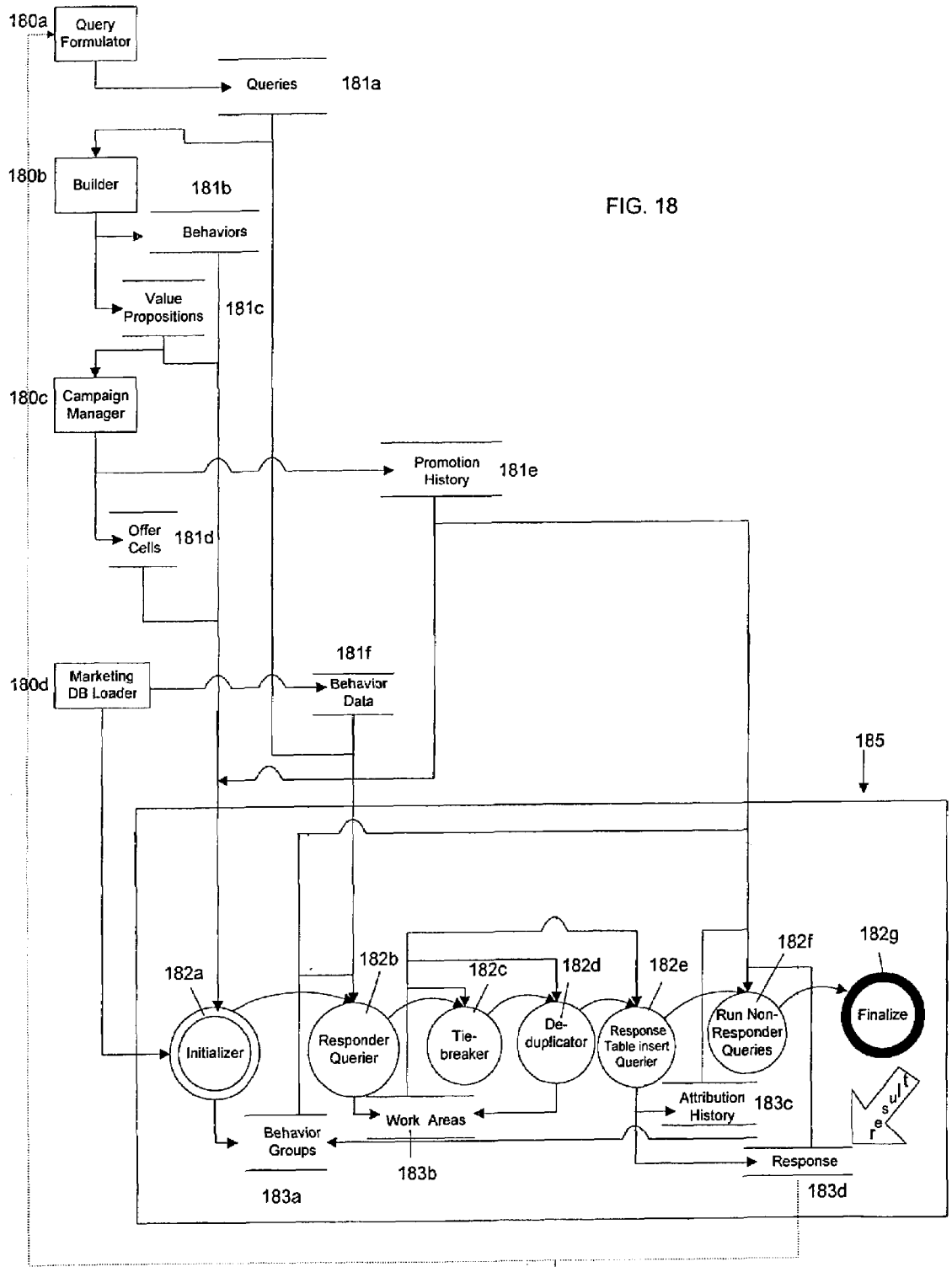
FIG. 18 illustrates an example of a system for performing implied attribution.

FIG. 18 shows one embodiment of a system for performing implied attribution, including the relationship of the processing components 180a-d, databases or data sources stored in memory 181a-f, result tables 183a-d and the components 182a-g of attribution engine 185. The processing components 180a-d may be software running on a general purpose computer as separate components or as part of an integrated package. The software may initially be provided on one or more computer storage medium, such as a CD-rom or diskette. The databases or data sources and other information 181a-f, 183a-d may be stored in any computer memory or may be information stored in a format other than a database. The databases-data sources 181a-f and results tables 183a-d may be stored in one memory system separate systems (or some combination thereof). For example, while result tables 183a-d are shown in FIG. 18 as part of the attribution engine, these may actually be stored separately or as a part of a customer data table. The attribution engine 185 (including its components 182a-g) may also be software running on a general purpose computer and implemented as a part, or separately from, the other processing components 180a-d.

In the embodiment of FIG. 18, query formulator 180a can be used to form the queries 181a, such as in the selection of the contact groups from a potential customer database, as described previously with reference to FIG. 8A. An example of a query formulator is included in the VALEX™ program sold by Exchange Applications of Boston, Mass., others being set forth above.

Builder processor 180b allows a user to form behavior and value proposition input tables 181b and 181c respectively, such as those discussed previously with reference to FIGS. 7A and 7B, and may use the graphical interfaces described above.

Figure 4A:
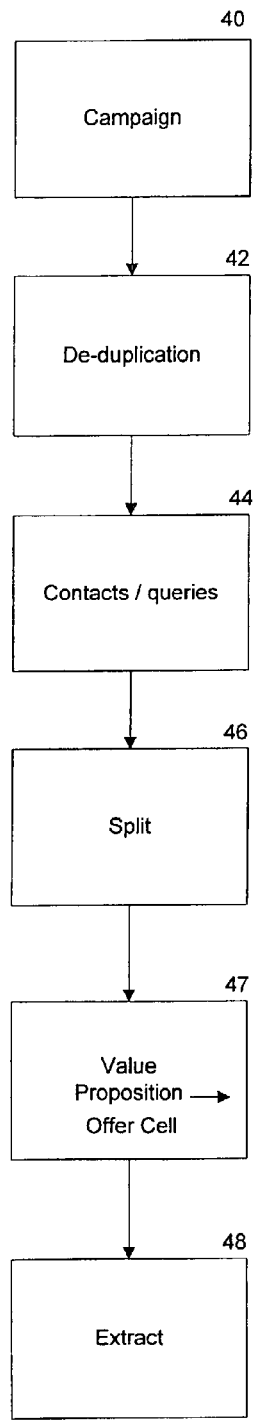
FIG. 4A illustrates one embodiment of a method for performing campaign management.
Figure 4B:
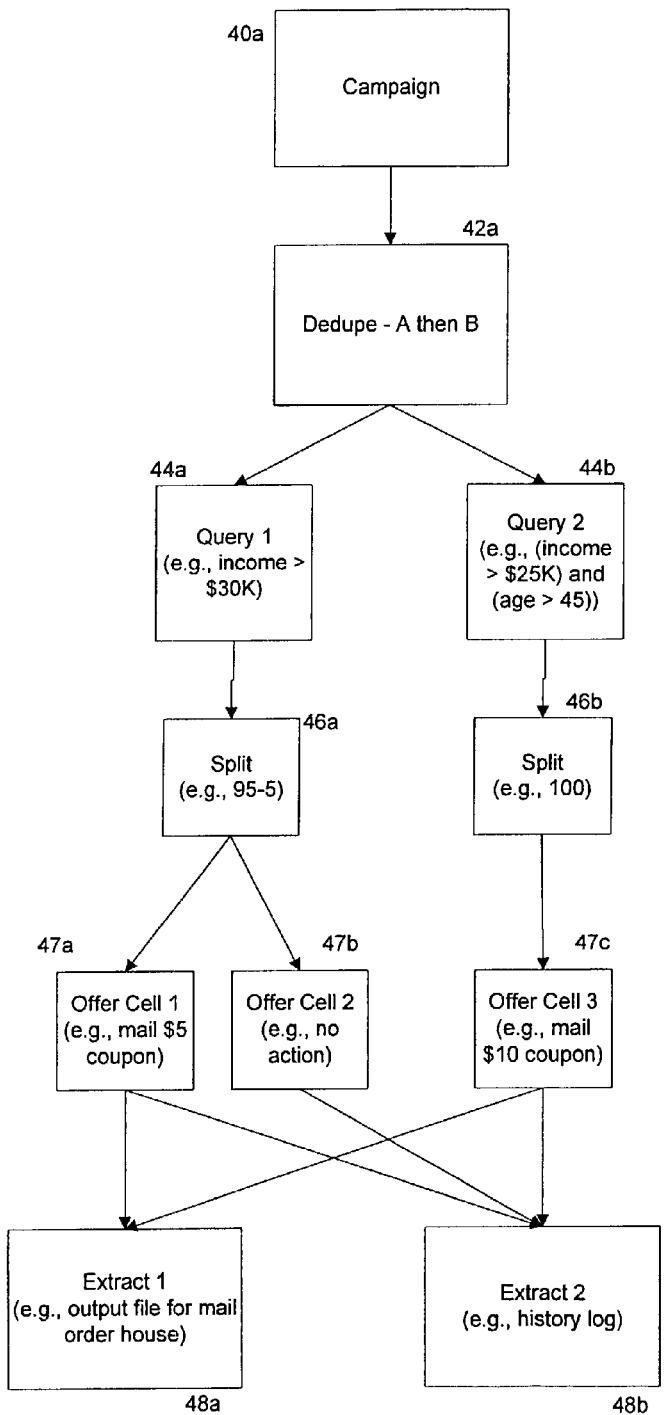
FIG. 4B illustrates an example of campaign management according to the method of FIG. 4A.
Figure 4C:
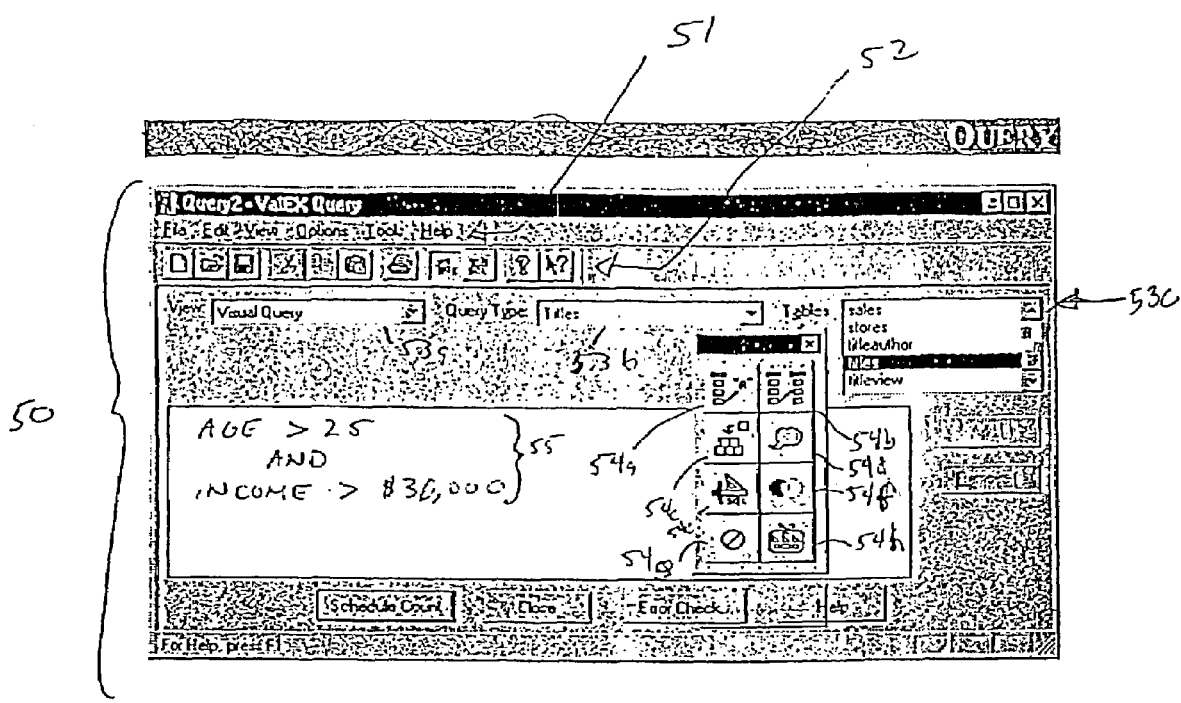
FIG. 4C illustrates an example of a graphical interface for constructing a query.

With campaign manager 180c, the user can select value propositions 181c for contact groups to form offer cells 181d, and identify certain behaviors of interest for the offer cell 181d. An example campaign was previously described with reference to FIG. 8A. Processors 180a-c can be components of campaign management system known in the art, such as the VALEX™ software program, modified to support the functionality and specification of information described herein. With campaign manager 180c, promotion history table 181e can be formed, an example of which can be found in FIG. 9, from the extracts used in the campaign (for example, as discussed with reference to FIGS. 4A and 4B).

Marketing database loader 180d may be used to input the marketing information about consumer behavior. Thus, the marketing database loader provides the behavior data 181f. The marketing database loader may be implemented using software which simply receives a marketing database and places it in an identifiable location in memory 181f. The marketing database loader may include more sophisticated functions, such as repackaging an input database into a format more suitable for the behavior data 181f. The behavior data 181f may include one or more tables that reflect consumer behavior, such as the sales table and inquiry table illustrated in FIGS. 10A and 10B in the above example.

Attribution components 182a-g of the attribution engine 185 performs the processes previously described with reference to FIG. 11. Initializer 182a receives a request for attribution to begin and allows the engine 185 to be connected with various relevant input databases, such as 181b-f.

The initializer may further perform the steps of FIGS. 12A and 12B described above, e.g., identifying the behaviors that are shown in the behavior data 181f in order to identify which offer cells (181d) may be used for attribution. The initializer 182a may take this information in order to build a behavior group table 183a for use by the remaining components in the implied attribution process. The behavior group table 183a includes a record for each offer cell/targeted behavior combination applicable to the behavior data 181f that is being analyzed.

FIG. 19 illustrates an example of a behavior group table, for the campaign example described above. A column 190 identifies an applicable offer cell, such as offer cell 300 or offer cell 301. Column 191 indicates the behavior type, e.g., "purchases" is a targeted behavior for offer cell 300. Similarly, "inquire" is a targeted behavior for offer cell 300. Assuming that both of these behaviors are tracked in the behavior data 181f, a behavior group table may be in a form that includes a record for each of these. On the other hand, if the behavior data 181f did not happen to include information about inquiries, the rows 195 and 196 may be omitted from the behavior group table. The behavior group table is used to identify offer cell/behavior combinations of interest when attributing behavior to contacts.

Table VI schematically illustrates an example of how the fields of a record in the behavior group table can be defined.

TABLE VI

| Field Name | Data Type | Key | Description |
|---|---|---|---|
| <OFFER_CELL_FIELD_1> | <TYPE> | PK, FK | First Field in group that Uniquely Identifies Offer Cell |
| <OFFER_CELL_FIELD_2> | <TYPE> | PK, FK | Second Field in group that Uniquely Identifies Offer Cell |
| ... | | | |
| <OFFER_CELL_FIELD_N> | <TYPE> | PK, FK | Last Field in group that Uniquely Identifies Offer Cell |
| BEHAVIOR_GROUP | INTEGER | PK | The unique identifier within Cell to index behavior groups |
| BEHAVIOR_ID | INTEGER | | The sought after behavior in this response group. |
| EVAL_START_DAY | INTERVAL | | The start day relative to extract date for evaluation of this response group. |
| EVAL_END_DAY | INTERVAL | | The end day relative to extract date for evaluation of this response group. |
| EST_FULFILLMENT | NUMERIC (10, 2) | | The estimated fulfillment cost from the value proposition. |
| EST_RETURN | NUMERIC (10, 2) | | The estimated return value from the associated value proposition. |
| ACTION_TABLE | CHAR (128) | | The name of the Action Table that is associated with this behavior. |

TABLE VI-continued

| Field Name | Data Type | Key | Description |
|---|---|---|---|
| ACTION_DATE_FIELD | CHAR (128) | | The name of the field that contains the date in the Action Table. |

Returning to FIG. 18, responder querier 182b performs implied attribution. The responder querier 182b may, therefore, perform the steps described above with reference to FIG. 12C (or some other process, such as formulating and issuing queries to capture responses). Formulator 180a, which generates queries (or parts of the queries) 181a, can be used to develop the queries for responder querier 182b. The queries are not necessarily generated from the processor used to generate the campaign and any query engine can be used in conjunction with responder querier 182b.

Areas 183a-c are temporary memory storage areas used to store results from any of attribution units 182a-f (and can be dropped upon ending the attribution).

After responder queries have been run, responder querier 182b can transfer the results to work area 183a in the form of a work table. An example work table was described previously with reference to FIG. 14.

After a work table has been formed through the responder querier 182b, the results may be manipulated by a tie breaker processing component 182c. The tie breaking component 182c may perform a tie breaking process such as the one illustrated in FIG. 15. Thus, the winners and losers of tie breaking may be marked in the work table (in an alternative embodiment, rather than marking winners and losers of tie breakers, the losers of tie breakers could be deleted from the work table).

A deduplicater 182d may then manipulate the work table stored in work area 183b. As described above, the deduplicater may examine a current response table 183d in order to remove any identical records stored in the work table 183b. This would prevent creation of duplicate records at a later step when the work table in 183b is incorporated in the response table 183d. Of course, in other embodiments, duplication can be avoided at the time that the work table 183b is added to the response table 183d, or the two could be merged, with duplicates eliminated after merging.

Once the processing of the work table in the work area 183b, the results can be posted into an ongoing response table 183d. This may be performed by the response table insert querier. An example of a response table was previously shown in FIG. 17A. Behavior group table 183a and the work table in work area 183b can be dropped at this point. Results from the response area 183d can be used in a new campaign as shown by arrow 186, and described below with reference to FIG. 20.

After the implied attribution steps have been performed by units 182b-182e, nonresponder querier 182f may probe for nonresponders. Referring to the behavior group table of FIG. 19 as an example, nonresponder querier 182f confirms that the evaluation period has been completed, and attribution performed, for each offer cell/behavior in the behavior group table, and performs the query for nonresponders, as discussed above with reference to FIG. 17B. This may be performed by building a new behavior group table 183a. In this case, however, all of the targeted behaviors may be included in the behavior group table, whether or not the particular behavior data 181f being analyzed includes information for that type of behavior. For example, referring again to FIG. 18, all of the behaviors are included in the behavior group table. For example, even in the behavior data 181f did not include inquiry information (and, for that reason, the earlier behavior group table did not include rows 195 and 196), the records 195 and 196 would be included. (In other embodiments, non-responders may be determined before all possible attribution has been computed.) The nonresponder results may then posted into response area 183d.

Referring again to FIG. 6, two possible uses of implied attribution are illustrated. Step 64 shows performing additional marketing acts based on the attribution process. Step 65 illustrates evaluating the campaign based on the implied attribution. Each of these are discussed in turn.

Figure 20:
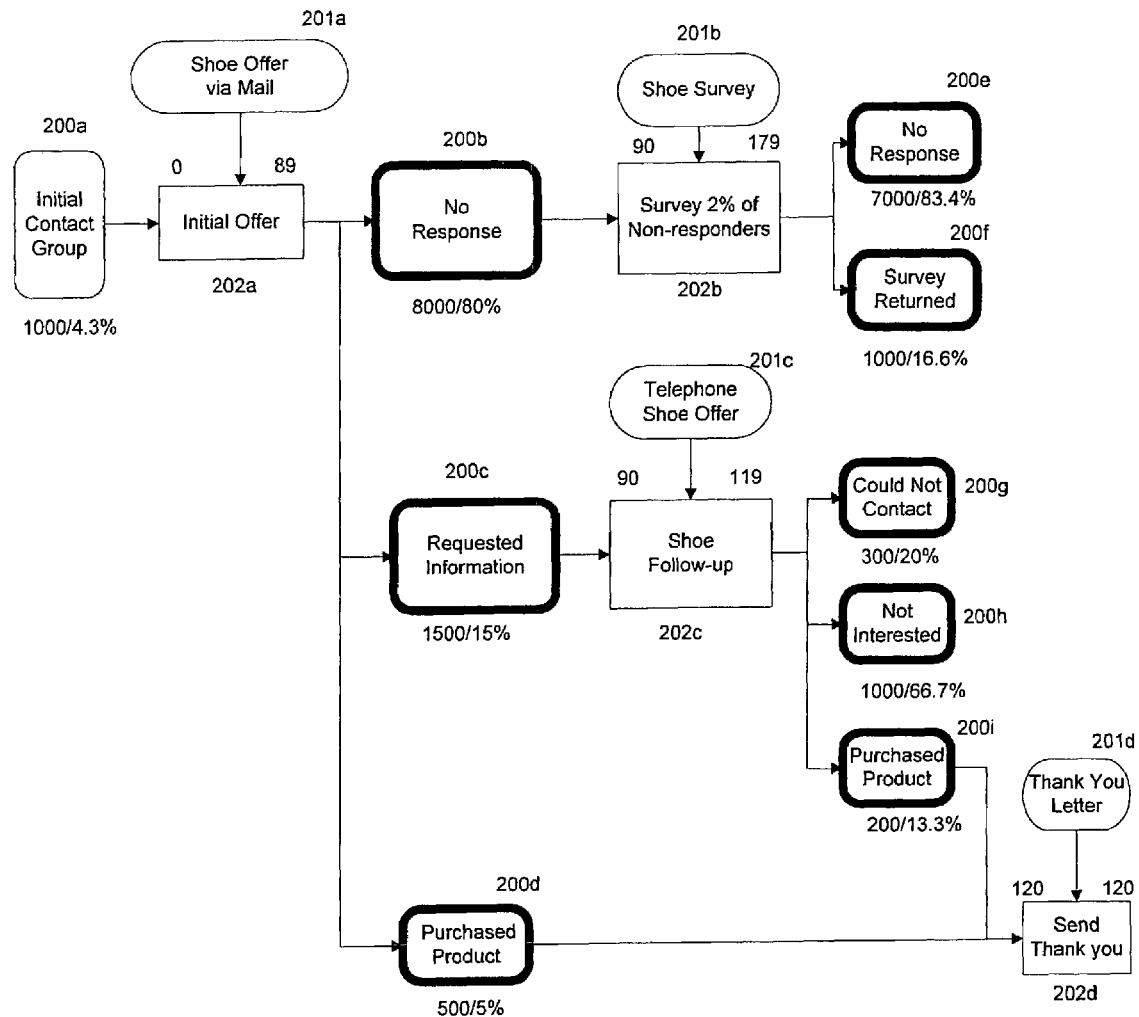
FIG. 20 illustrates some examples for using implied attribution in an ongoing campaign.

FIG. 20 illustrates an example of using implied attribution in an ongoing campaign to perform additional marketing acts (e.g., new additional offer cells).

In FIG. 20, at 200a, an initial contact group is identified. This may be performed as described above with respect to campaign management generally, e.g., by formulating a query for a potential customer group database and then selecting the contacts from that database using the query.

A value proposition 201a is also identified as described above. In the example of FIG. 20, this value proposition is a shoe offer sent by mail to the individuals in the initial contact group 200a. When the value proposition is applied to an individual campaign, an offer cell 202a is formed.

After execution of this (simple) campaign, the behavior may be classified into three categories as described above. The first category 200b identifies nonresponders for the offer cell 202a. The second category 200c identifies contacts who requested information as a result of the offer cell 202a (determined through implied attribution using, for example, an embodiment described above). The third category 200d identifies people in the initial contact group 200a that purchased a product as a result of the offer cell 202a. The categorization of the people in the initial contact group 200a and to different groups through implied attribution permits discrimination among those groups for further campaign marketing steps.

In FIG. 20, for example, the identified nonresponders 200b are used as a contact group for a new segment of the campaign. In this segment, a value proposition 201b of sending a survey is used. The application of the value proposition 201b to the contact group of nonresponders 200b results in an offer cell 202b. Once again, the results of the offer cell 202b may be classified into responders (who return the survey 200f) and nonresponders 200e. In this case, implied attribution may not be necessary to classify people who returned the survey and people who did not—this would be known from the receipt of the survey itself.

Similarly, the people who requested information as a result of the offer cell 202a (classified in 200c) may be selected as a contact group for the value proposition 201c. The value proposition 201c corresponds to a telephone shoe offer. Application of this value proposition to the group of people 200c who requested information as a result of the offer cell 202a results in the offer cell 202c (a show follow-up telephone call). Once again, the behavior of these people may be attributed to the offer cell, as indicated at 200g-i.

The group of responders that purchased product 200*d* as a result of the offer cell 202*a* may receive a value proposition 201*d*—a thank you letter. Similarly, the people who purchased product 200*i* as a result of the offer cell 202*c* may also receive the value proposition 201*d* through offer cell 202*d*.

In sum, the attribution process may be used to more carefully target consumers indicating desired behavior.

Returning to FIG. 6, step 65 illustrates an alternate step of evaluating a campaign.

Figure 21:
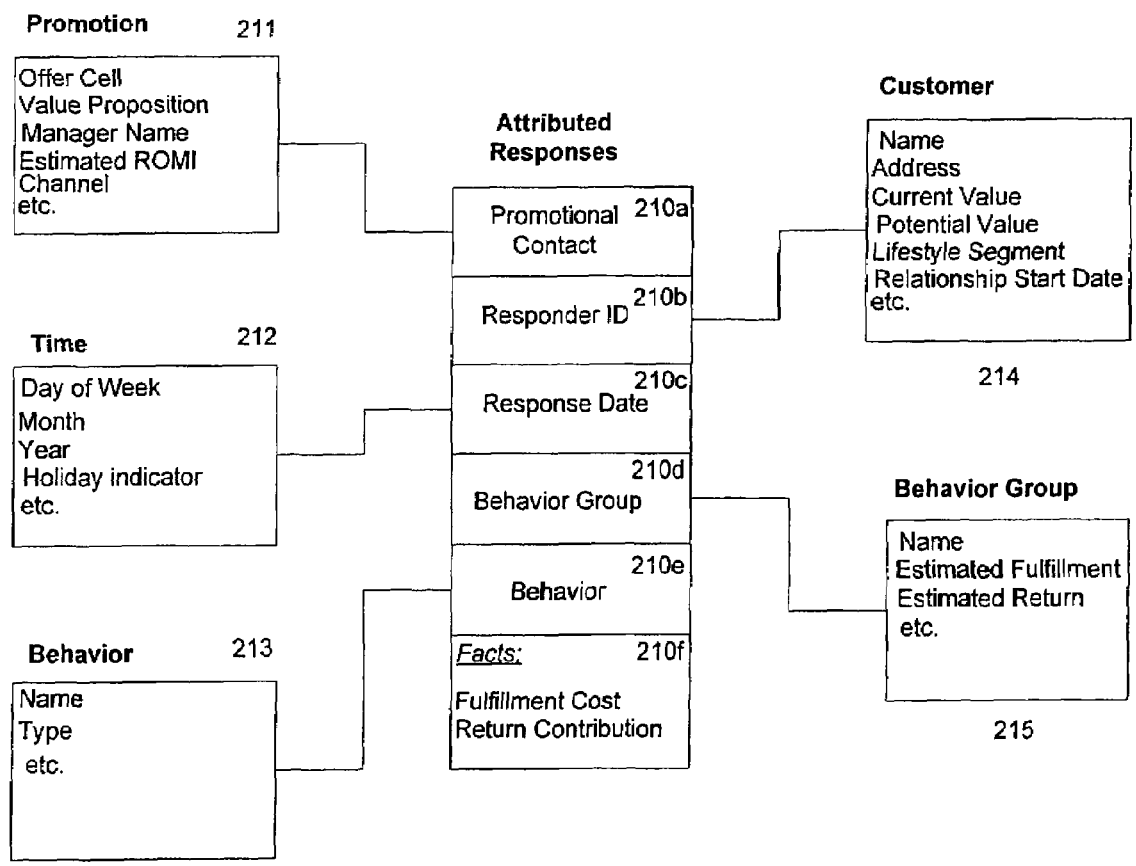
FIG. 21 illustrates some examples for gathering information from implied attribution.

FIG. 21 illustrates one example of how information gathered through the embodiments described above may be used for assessing a campaign.

In the embodiment described above, the implied attribution process builds a response table. This response table may be used as a center point for analysis of a campaign. In FIG. 21, a response table 210 provides information on responders (and nonresponders) for one or more campaigns. Each record in the response table may include the indicated fields 210*a-f* (which are illustrative, and any other combination or additional fields may be used).

The information in these fields can be used to access other records within the system. For example, the promotional contact information 210*a* may be used to access information about the promotional campaign 211. This information may include offer cell information, value proposition information or other recorded information such as the manager name, the estimated return on the marketing investment, etc.

Similarly, the responder ID field 210*b* may be used to access customer information 214. This customer information can include name, address, lifestyle segment, etc.

The response date field 210*c* may further provide access to time information. This time information may be compiled to include day of week, month, year, holiday, etc.

The behavior group field 210*d* may provide access to behavior group information 215—which can include estimated cost and return information (also accessible through the promotion fields).

Other facts, such as cost and return contribution 210*f*, may be included in the response table 210.

These interrelated tables (which could be arranged in any other way or included in one complete table) permit easy sophisticated analysis of a marketing campaign. For example, the database can be checked to see if any particular time of year is more likely to receive successful responses for certain types of campaigns. This can be done by accessing the response date information through the response table 210. This analysis is enabled by providing a table that includes information attributing consumer behavior to marketing actions (offer cells).

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A method of automatically attributing a plurality of behavior records to a first offer of a campaign, the first offer associated with a first contact group including a plurality of contacts, the method comprising:
    providing access to behavior records to an automated attribution system;
    inputting a first target behavior associated with a first offer to the automated attribution system;
    determining by automated implied attribution which of the behavior records are attributable to the first offer, based on the behavior records, contacts in a first contact group and the first target behavior, the determining by automated implied attribution comprising attributing one of the behavior records to the first offer based on whether the one of the behavior records corresponds to an entity in a target group for the first offer, even when the entity is not in the first contact group;
    recording results of the determining by automated implied attribution on a computer storage medium;
    inputting a second target behavior for the first offer to the automated attribution system; and
    determining by implied attribution which of the behavior records are attributable to the first offer, based on the behavior records and the input second target behavior.

2. The method of claim 1, wherein a campaign includes a second offer associated with a second contact group including a plurality of contacts and the method further comprises:
    inputting a third target behavior for the second offer to the automated attribution system; and
    determining by implied attribution which of the behavior records are attributable to the second offer, based on the input behavior records and the input target behavior for the second offer.

3. The method of claim 2, wherein the determining by automated implied attribution further comprises:
    breaking ties when one of the behavior records can be attributed to more than one of the first offer and the second offer.

4. The method of claim 1, wherein the determining by automated implied attribution further comprises formulating a query to capture behavior records.

5. The method of claim 1, further comprising:
    inputting additional behavior records to the automated attribution system;
    after the determining by automated implied attribution, determining by implied attribution which of the additional behavior records are attributable to the first offer; and
    recording which of the additional behavior records are attributable to the first offer on the computer storage medium.

6. The method of claim 5, further comprising preventing duplicate entries on the computer storage medium.

7. The method of claim 1, further comprising:
    assigning one of a plurality of additional actions to a plurality of entities identified in the behavior records, based on the results of the determining by automated implied attribution.

8. The method of claim 1, wherein the determining by automated implied attribution further comprises:
    inputting attribution criteria; and
    attributing behavior records based on the attribution criteria.

9. The method of claim 8, wherein the attribution criteria comprises a time window.

10. The method of claim 1, further comprising:
    determining by direct attribution whether a plurality of the behavior records are attributable to the first offer, based on the input behavior records.

11. The method of claim 1, further comprising:
    analyzing a campaign based on the results of the determining by automated implied attribution.

12. The method of claim 1, further comprising:
    identifying contacts, in the first contact group, that did not respond to the first offer.

13. The method of claim 1, wherein the determining by automated implied attribution further comprises:

identifying a plurality of behavior records attributable to one of the contacts in the first contact group.

14. The method of claim 1, wherein the recording comprises:
recording type of behavior information for each behavior record attributed to the first offer.

15. The method of claim 1, wherein the recording comprises:
recording associated entity information for each behavior record attributed to the first offer.

16. The method of claim 1, wherein the step recording comprises:
recording time of behavior information for each behavior record attributed to the first offer.

17. An automated attribution system to attribute a plurality of behavior records to a first offer of a campaign, the first offer associated with a first contact group including a plurality of contacts, the system comprising:
means for accessing behavior records;
means for automatically implying attribution of the behavior records to a first offer, including attributing one of the behavior records to a first offer based on whether the one of the behavior records corresponds to an entity in a target group for the first offer, even when the entity is not in the first contact group;
means for inputting a target behavior for the first offer; and
means for determining by implied attribution which of the behavior records are attributable to the first offer, based on the behavior records and the input target behavior.

18. The system of claim 17, wherein the means for determining by implied attribution is further based on the input target behavior and a second target behavior.

19. The system of claim 17, wherein the means for automatically implying comprises:
means for automatically implying attribution of the behavior records to a second offer of a campaign.

20. The system of claim 19, further comprising:
means for breaking ties when one of the behavior records can be attributed to both the first offer and the second offer.

21. The system of claim 17, wherein the means for automatically implying comprises:
means for automatically formulating a query to capture behavior records.

22. The system of claim 17, wherein the means for automatically implying comprises:
means for successively analyzing the behavior records to attribute which of the behavior records are attributable to the first offer.

23. The system of claim 22, wherein the means for successively analyzing comprises:
means for recording information corresponding to attributed behavior records, including means for preventing duplication of the recorded information.

24. The system of claim 17, in combination with a campaign management system.

25. The system of claim 17, further comprising:
means, responsive to the means for automatically implying, for assigning one of a plurality of additional actions to a plurality of entities identified in the behavior records.

26. The system of claim 17, wherein the means for automatically implying comprises:
means for attributing behavior records based on input attribution criteria.

27. The system of claim 17, further comprising
means for identifying contacts, in the first contact group, that did not respond to the first offer.

28. The system of claim 17, further comprising
means for building a response table, the response table including information associated with individual behavior records attributed to the first offer.

29. The system of claim 28, wherein the information associated with individual behavior records includes information selected from the group consisting of type of behavior and time of behavior.

30. A method of recording attribution information on a computer storage medium, for a first offer of a campaign, the first offer associated with a first contact group including a plurality of contacts, the method comprising:
providing attribution information relating a plurality of behavior records to a first offer, including attributing one of the behavior records to the first offer based on whether the one of the behavior records corresponds to an entity in a target group for the first offer, even when the entity is not in a first contact group;
recording response records in a response table stored on a computer storage medium, each response record being associated with at least one respective behavior record;
inputting a target behavior for the first offer to an automated attribution system; and
determining by implied attribution which of the behavior records are attributable to the first offer, based on the behavior records and the input target behavior.

31. The method of claim 30, wherein the response record comprises a field specifying a time of behavior.

32. The method of claim 30, wherein the response record comprises a field specifying entity information for each behavior record attributed to the first offer.

33. The method of claim 30, wherein the response record comprises a field specifying a type of behavior for the response record.

34. A computer program embodied on a computer-readable medium for attributing a plurality of behavior records to a first offer of a campaign, the first offer associated with a first contact group including a plurality of contacts, the program comprising:
a code segment to provide access to behavior records;
a code segment to allow input of a first target behavior associated with a first offer;
a code segment to determine by a first implied attribution which of the behavior records are attributable to the first offer, based on the first target behavior, the determining by implied attribution comprising attributing one of the behavior records to the first offer based on whether the one of the behavior records corresponds to an entity in a target group for the first offer, even when the entity is not in the first contact group;
a code segment to allow input of a second target behavior for the first offer; and
a code segment to determine by a second implied attribution which of the behavior records are attributable to the first offer, based on the behavior records and the input second target behavior.

35. The computer program of claim 34, wherein a campaign includes a second offer and the computer program further comprises:
a code segment to determine by a third implied attribution which of the behavior records are attributable to the second offer, based on a third input target behavior for the second offer.

36. The computer program of claim 35, wherein the code segment to determine by the third implied attribution comprises a code segment to break ties when one of the behavior records can be attributed to more than one of the first offer and the second offer.

37. The computer program of claim 34, wherein the code segment to determine by the first implied attribution comprises a code segment to automatically formulate a query to capture behavior records.

38. The computer program of claim 34, further comprising a code segment to store response records in a response table, each response record corresponding to at least one of the attributed behavior records.

39. The computer program of claim 34, further comprising a code segment to perform campaign management.

* * * * *

UNITED STATES PATENT AND TRADEMARK OFFICE
CERTIFICATE OF CORRECTION

| | | |
|---|---|---|
| PATENT NO. | : 7,370,003 B2 | Page 1 of 1 |
| APPLICATION NO. | : 10/290547 | |
| DATED | : May 6, 2008 | |
| INVENTOR(S) | : Pych | |

It is certified that error appears in the above-identified patent and that said Letters Patent is hereby corrected as shown below:

In the specification:
    Col. 5, line 45, please replace "patent application" with -- Patent Application --;

In the claims:
    Col. 29, line 11, please delete "step".

Signed and Sealed this
Twenty-fourth Day of May, 2011

David J. Kappos
*Director of the United States Patent and Trademark Office*